United States Patent
Yamamoto

(10) Patent No.: US 9,665,201 B2
(45) Date of Patent: May 30, 2017

(54) INFORMATION PROCESSING APPARATUS, CONTROL METHOD THEREOF, AND STORAGE MEDIUM FOR RECOGNIZING A MULTI-TOUCH OPERATION

(71) Applicant: CANON KABUSHIKI KAISHA, Tokyo (JP)

(72) Inventor: Keiichi Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 82 days.

(21) Appl. No.: 13/786,289

(22) Filed: Mar. 5, 2013

(65) Prior Publication Data

US 2013/0234960 A1 Sep. 12, 2013

(30) Foreign Application Priority Data

Mar. 7, 2012 (JP) ................................. 2012-050682

(51) Int. Cl.
G06F 3/041 (2006.01)
G06F 3/0488 (2013.01)

(52) U.S. Cl.
CPC ............ G06F 3/0416 (2013.01); G06F 3/041 (2013.01); G06F 3/04883 (2013.01); G06F 2203/04808 (2013.01)

(58) Field of Classification Search
None
See application file for complete search history.

(56) References Cited

U.S. PATENT DOCUMENTS

| | | | |
|---|---|---|---|
| 8,217,909 B2 * | 7/2012 | Young | 345/173 |
| 2008/0165141 A1 * | 7/2008 | Christie | 345/173 |
| 2009/0096753 A1 * | 4/2009 | Lim | 345/173 |
| 2009/0178002 A1 | 7/2009 | Haitani et al. | |
| 2011/0032192 A1 | 2/2011 | Mills et al. | |
| 2012/0068950 A1 * | 3/2012 | Conde | G06F 3/04847 345/173 |
| 2012/0206380 A1 * | 8/2012 | Zhao et al. | 345/173 |
| 2012/0223898 A1 * | 9/2012 | Watanabe et al. | 345/173 |
| 2013/0016103 A1 * | 1/2013 | Gossweiler et al. | 345/428 |
| 2013/0147731 A1 * | 6/2013 | Adachi | 345/173 |

FOREIGN PATENT DOCUMENTS

| | | |
|---|---|---|
| CN | 101198925 A | 6/2008 |
| CN | 101667089 A | 3/2010 |
| CN | 202142028 U | 2/2012 |
| JP | 2001290585 A | 10/2001 |
| JP | 2011-059952 A | 3/2011 |
| JP | 2011070250 A | 4/2011 |
| RU | 2417399 C2 | 4/2011 |
| RU | 2435194 C2 | 11/2011 |

* cited by examiner

*Primary Examiner* — Jennifer Mehmood
*Assistant Examiner* — Stephen T Reed
(74) *Attorney, Agent, or Firm* — Canon USA Inc., IP Division

(57) ABSTRACT

An information processing apparatus capable of recognizing a multi-touch operation acquires positions of a plurality of touch points that constitutes the multi-touch operation, acquires information indicating a distance between two touch points that constitute the multi-touch operation based on the acquired positions, and determines that the input multi-touch operation is an enlargement or reduction operation that causes a display unit to enlarge or reduce an image to be displayed thereon, if the distance between the two touch points indicated by the acquired information has been continuously enlarged or reduced.

11 Claims, 11 Drawing Sheets

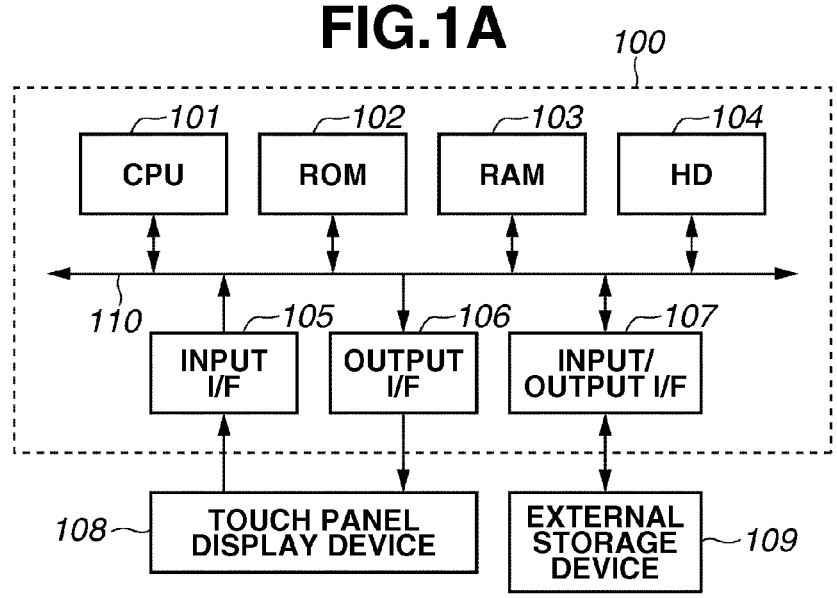
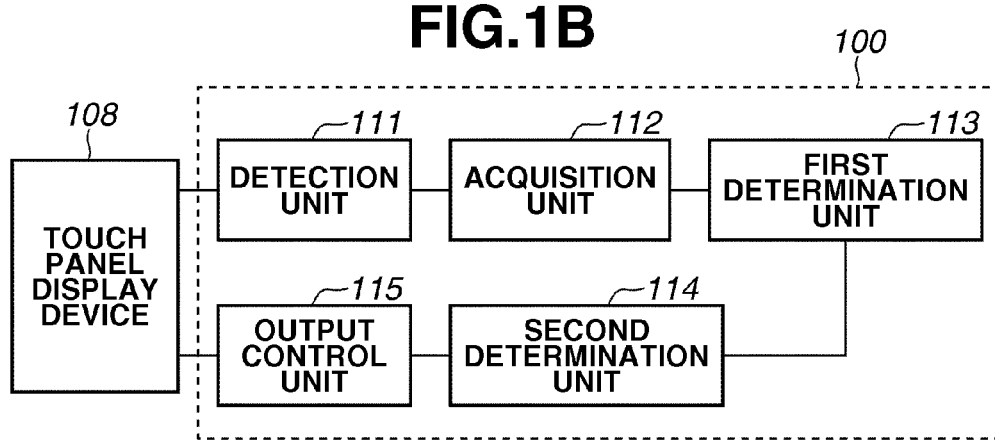
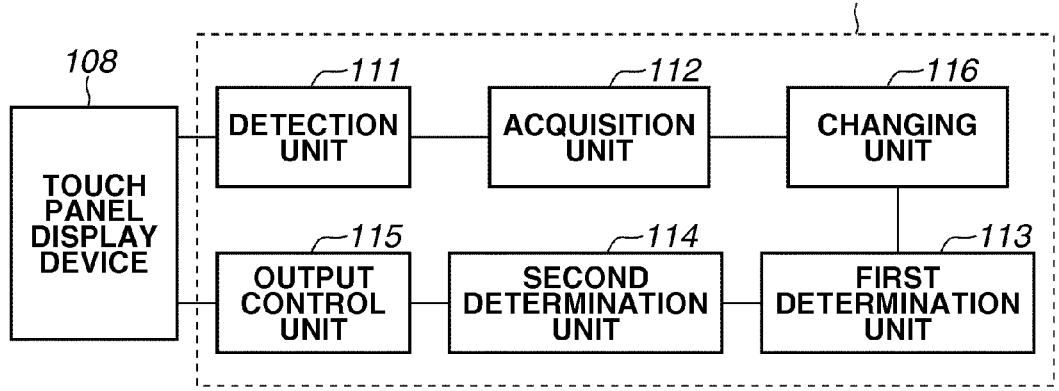

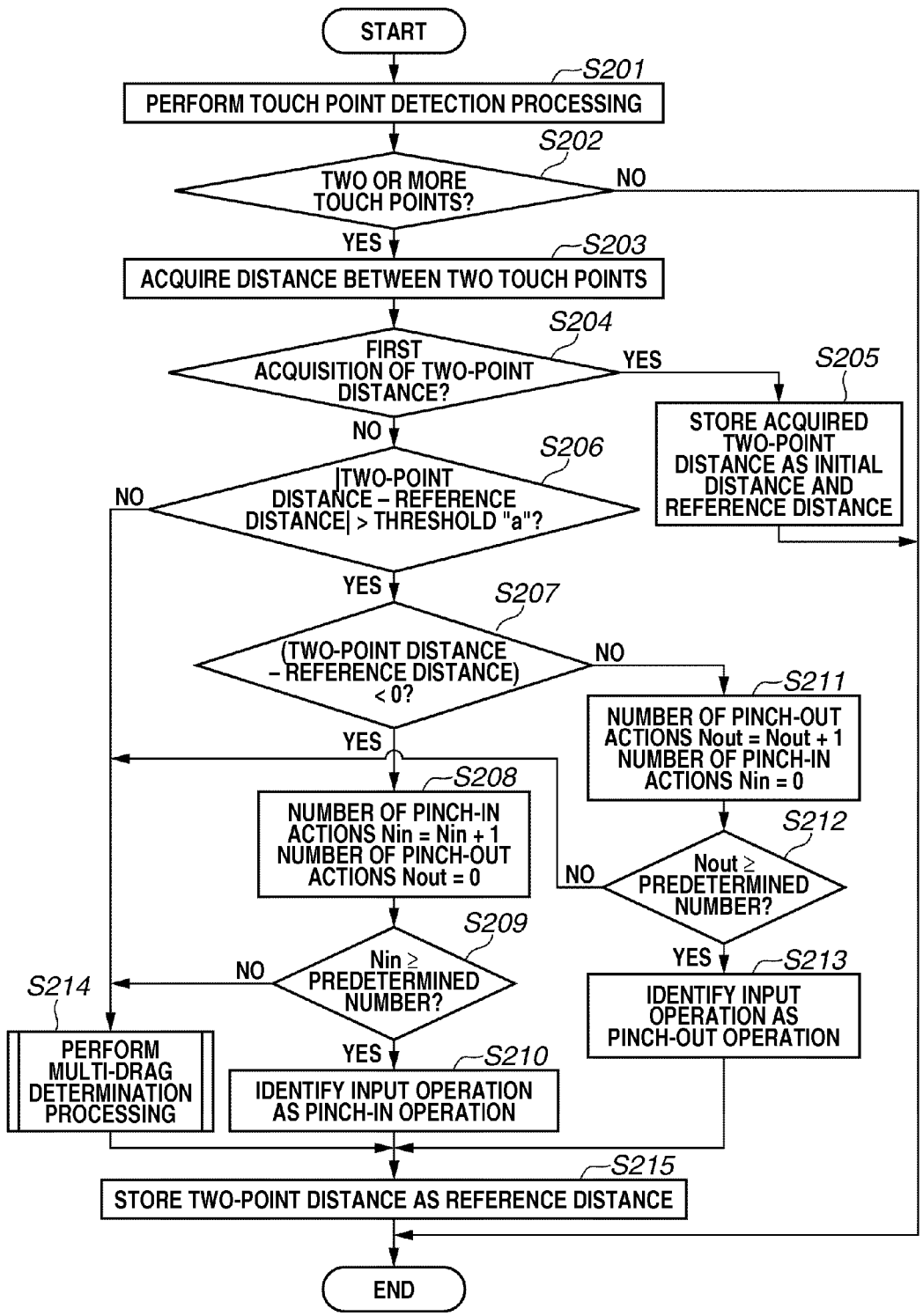

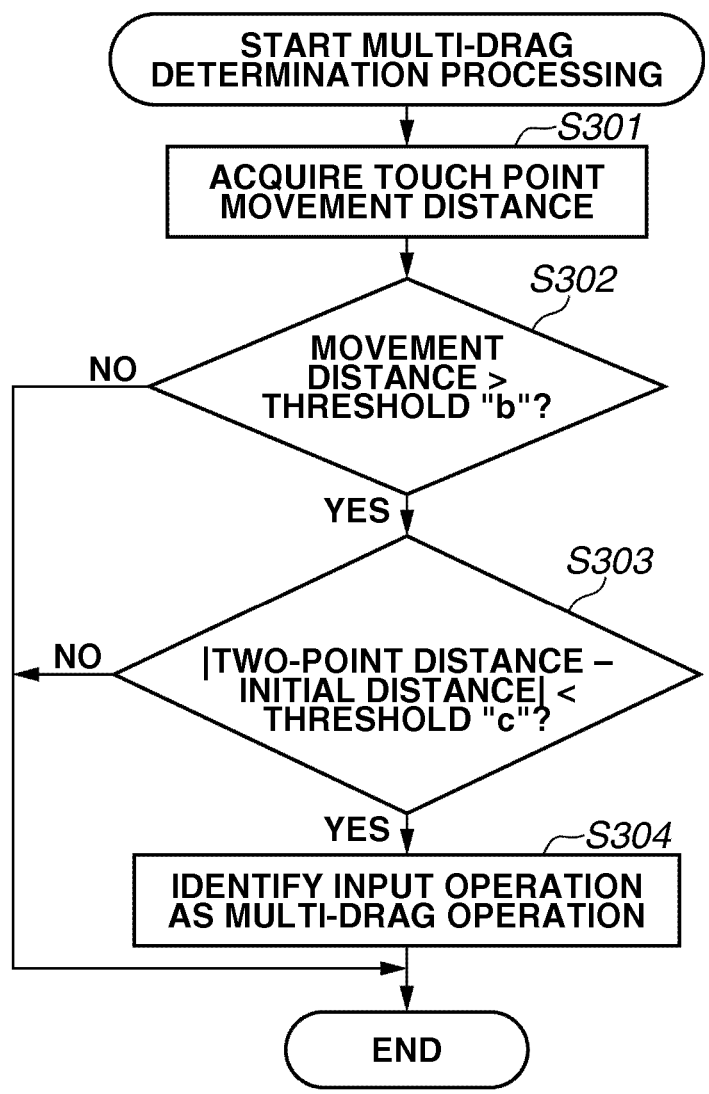

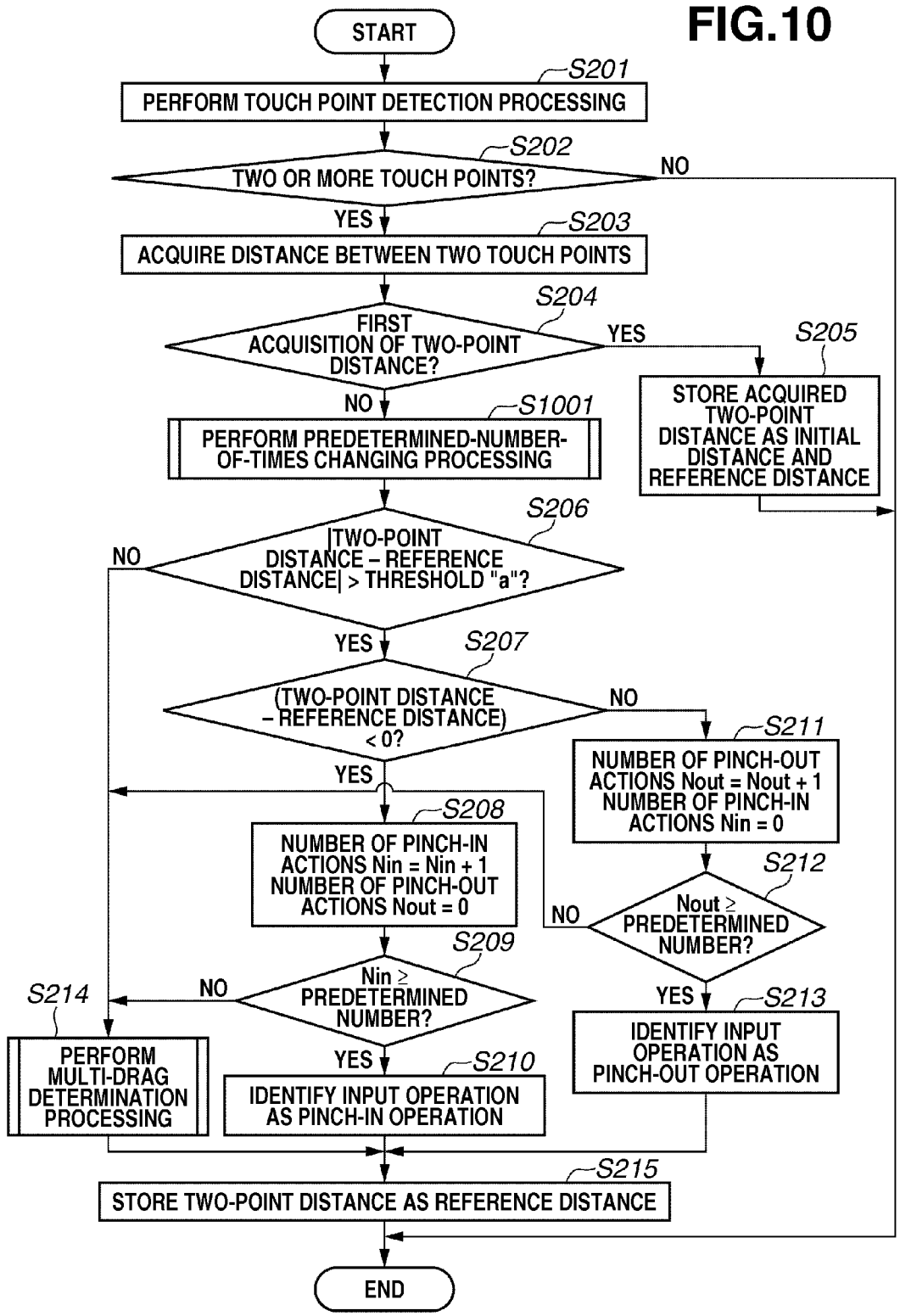

INFORMATION PROCESSING APPARATUS, CONTROL METHOD THEREOF, AND STORAGE MEDIUM FOR RECOGNIZING A MULTI-TOUCH OPERATION

BACKGROUND OF THE INVENTION

Field of the Invention

The present invention relates to an information processing technique capable of recognizing a multi-touch operation input by a user.

Description of the Related Art

It is conventionally known that a touch input device is capable of acquiring X and Y coordinate values of each touched position on a screen, as input values, in response to a screen touch with a user's finger or a stylus, and performing various types of processing based on the input values.

Further, there is a conventionally-known technique generally referred to as a multi-touch operation, which enables a user to perform an intended operation by touching a plurality of points on a screen. In general, a representative multi-touch operation on a touch panel is a pinch operation, which is a user's operation that decreases or increases the distance between two points touched by a user on the touch panel. In particular, a user's operation that moves two touch points in such a way as to reduce the distance between these points is referred to as "pinch in", which can realize a reduction of a displayed image. On the other hand, a user's operation that increases the distance between two points is referred to as "pinch out", which can realize an enlargement of a displayed image.

As discussed in Japanese Patent Application Laid-Open No. 2011-059952, when a user moves at least one of two fingers contacting a screen, it is feasible to recognize a pinch operation according to a change in distance between two fingers and change the magnification ratio of a displayed image. Further, at the same time, it is feasible to scroll the displayed image according to a finger movement direction.

SUMMARY OF THE INVENTION

The present invention is directed to a technique capable of eliminating an erroneous operation that is not intended by a user in an apparatus that enables the user to perform a multi-touch operation.

According to an aspect of the present invention, an information processing apparatus capable of recognizing a multi-touch operation includes a first acquisition unit configured to acquire positions of a plurality of touch points that constitutes the multi-touch operation, a second acquisition unit configured to acquire information indicating a distance between two touch points that constitute the multi-touch operation based on the positions acquired by the first acquisition unit, and a determination unit configured to determine that the input multi-touch operation is an enlargement operation that causes a display unit to enlarge an image to be displayed thereon, if the distance between the two touch points indicated by the information acquired by the second acquisition unit has been continuously enlarged.

According to another aspect of the present invention, an information processing apparatus capable of recognizing a multi-touch operation includes a first acquisition unit configured to acquire positions of a plurality of touch points that constitutes the multi-touch operation, a second acquisition unit configured to acquire information indicating a distance between two touch points that constitutes the multi-touch operation based on the positions acquired by the first acquisition unit, and a determination unit configured to determine that the input multi-touch operation is a reduction operation that causes a display unit to reduce an image to be displayed thereon, if the distance between the two touch points indicated by the information acquired by the second acquisition unit has been continuously reduced.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1A is a block diagram illustrating an example of a hardware configuration of an information processing apparatus according to an exemplary embodiment.

FIG. 1B is a block diagram illustrating an example of a functional configuration of the information processing apparatus according to an exemplary embodiment.

FIG. 1C is a block diagram illustrating another functional configuration of the information processing apparatus according to an exemplary embodiment.

FIG. 2 is a flowchart illustrating an example of multi-touch operation recognizing processing that can be performed by the information processing apparatus according to an exemplary embodiment.

FIG. 3 is a flowchart illustrating an example of multi-drag operation determination processing that can be performed by the information processing apparatus according to an exemplary embodiment.

FIG. 10 is a flowchart illustrating an example of multi-touch operation recognizing processing that can be performed by the information processing apparatus according to an exemplary embodiment.

DESCRIPTION OF THE EMBODIMENTS

Figure 4A:
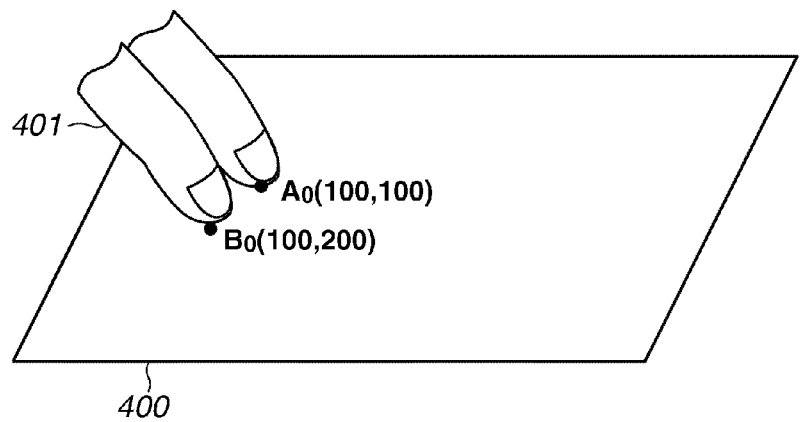
FIGS. 4A and 4B illustrate an example movement of two touch points in a multi-drag operation.

Various exemplary embodiments, features, and aspects of the invention will be described in detail below with reference to the drawings.

In exemplary embodiments of the present invention, descriptions of constituent component do not intend to narrowly interpret the scope of the present invention.

First, in a first exemplary embodiment, it is presumed that a user touches two points on a touch panel (i.e., in a multi-touch state). In the first exemplary embodiment, an information processing apparatus 100 is configured to prevent an unintentional pinch operation from being erroneously recognized when a user inputs a multi-touch operation. To this end, the information processing apparatus 100 is configured to set a condition to recognize a pinch (i.e., pinch-out or pinch-in) operation, as described below.

As an example of the multi-touch operation, it is presumed that a user performs a "multi-drag operation", in which the user moves two touch points in the same direction while substantially retaining the distance between the touch points at a constant value, as described below.

According to conventional multi-touch operation recognizing processing, acquisition of touch point information detected by a touch panel is performed sequentially for each touch point and recognition processing is promptly performed based on the acquired positional information. Accordingly, at the moment when the position where the first point (i.e., one of two touch points moved by the user to perform the multi-drag operation) has reached is acquired, the positional information of the other touch point is not yet updated and remains the same (i.e., the stored value indicating the pre-movement position). Therefore, it is determined that "the distance between two points has been enlarged" by an amount corresponding to the movement of the finger moved by the user.

Next, at the moment when the position where the second point has reached is acquired, the two-point distance is updated and recognized as a value similar to the previous value (i.e., the stored pre-movement value). Therefore, it is determined that "the distance between two points has been reduced." Accordingly, in a case where a user performs a multi-drag operation, alternating a pinch-out action and a pinch-in action is continuously notified based on the above-described determination results. Therefore, the apparatus performs an unnatural display by alternately repeating enlargement and reduction of a displayed image in a manner unintended by the user.

On the other hand, in the present exemplary embodiment, only when the distance between two points touched by a user has been continuously enlarged at least a predetermined number of times, it is determined that the pinch-out operation has been input. Further, only when the distance between two points has been continuously reduced at least a predetermined number of times, it is determined that the pinch-in operation has been input.

FIG. 1A illustrates an example of a hardware configuration of the information processing apparatus 100 according to the present exemplary embodiment. A central processing unit (CPU) 101 can perform arithmetic operations and logical determinations to realize various types of processing and can control each constituent component connected to a system bus 110. The information processing apparatus 100 includes memories that can store programs and/or data. A read-only memory (ROM) 102, which is operable as a program memory, stores control programs to be executed by the CPU 101 according to various types of processing procedures. A random access memory (RAM) 103, which is operable as a data memory, includes a work area usable when the CPU 101 executes the above-described programs, a data saving area to be used in case of error processing, and a loading area to which the above-described control programs can be loaded. Alternatively, an external storage device 109 can load programs into the RAM 103, to realize the program memory.

A hard disk (HD) 104 is a storage medium that can store data and programs according to the present exemplary embodiment. In the present exemplary embodiment, it is presumed that a plurality of types of image data is stored in the HD 104. The external storage device 109 connected via an input/output interface 107 is usable as a device having similar capability. In the present exemplary embodiment, the external storage device 109 can be realized by a recording medium associated with an external storage drive that can realize an access to the recording medium. For example, the recording medium is a flexible disc (FD), a compact disc read only memory (CD-ROM), a digital versatile disc (DVD), a universal serial bus (USB) flash drive, a magneto optical disc (MO), or a flash memory. Further, the external storage device 109 can be a server apparatus that is accessible via a network. Information required in the present exemplary embodiment is stored in any one of the RAM 103, the HD 104, and the external storage device 109.

An input interface 105 can control an input apparatus (e.g., a pointing device) and can recognize a change in the state of a detected touch point based on an input signal acquired from the input apparatus. The input interface 105 sends a recognition result to a system that recognizes a touch operation of the information processing apparatus 100. An output interface 106 can output a signal that controls an output indicating results of various types of processing having been executed to an output apparatus that includes a display unit (e.g., a liquid crystal display device or a television monitor). In the present exemplary embodiment, it is presumed that a touch panel display device 108 includes a touch panel (i.e., the input apparatus) and a display apparatus (i.e., the output apparatus). The touch panel display device 108 is united with the information processing apparatus 100. Alternatively, the touch panel display device 108 can be an external apparatus that is connected to the information processing apparatus 100 or can be an accessible independent device. In the present exemplary embodiment, the touch panel is a capacitive sensing type that can identify a touch point as coordinate values on a contact surface, when a user touches the panel surface. However, any other touch panel is usable because the touch panel is not limited to the capacitive sensing type.

FIG. 1B is a block diagram illustrating an example of a functional configuration of the information processing apparatus 100 according to the present exemplary embodiment. A detection unit 111 is constituted by the CPU 101, the ROM 102, and the RAM 103. In the present exemplary embodiment, the detection unit 111 is configured to detect information relating to a touch point touched by a user based on a signal received from the input interface 105. In this case, in the present exemplary embodiment, it is presumed that the input interface 105 refers to information relating to a plurality of touch points detected by the touch panel (i.e., the input apparatus) at constant intervals and sequentially sends a notification signal to the detection unit 111 in response to acquisition of information relating to each point. Accordingly, the detection unit 111 analyzes the acquired signal and detects information relating to each touch point one by one. The touch point related information includes positional information of each touch point, time information indicating detection timing of each touch point, and ID information identifying each one of a plurality of touch points. In this case, associating a detection order of each touch point with ID is useful to manage two or more touch points.

The detection unit 111 associates touch point information with ID and stores the associated information/ID combination for each touch point. The detection unit 111 can detect the latest information of an already detected touch point with reference to its ID. Therefore, the detection unit 111 can detect a movement of a touch point by checking if the present position of the touch point is different from the position of a previously detected touch point having the same ID. Further, the detection unit 111 can detect a releasing of the touch at the detected touch point. In the present exemplary embodiment, if the releasing of the touch at the touch point is detected, the detection unit 111 deletes the relevant touch point information stored beforehand.

An acquisition unit 112 is by the CPU 101, the ROM 102, and the RAM 103. The acquisition unit 112 is configured to acquire the distance between two detected points when two touch points are detected by the detection unit 111. A first determination unit 113 is constituted by the CPU 101, the ROM 102, and the RAM 103. The determination unit 113 is configured to determine whether a pinch operation that instructs enlarging or reducing the displayed image has been input, based on the number of times the distance between two points acquired by the acquisition unit 112 has been continuously enlarged or continuously reduced. In the present exemplary embodiment, if the distance between two points has been continuously enlarged or reduced at least a predetermined number of times, the first determination unit 113 determines that the pinch operation has been input.

Further, the first determination unit 113 is configured to determine whether a multi-touch operation other than the pinch operation has been input in a case where the pinch operation has not been input. A second determination unit 114 is constituted by the CPU 101, the ROM 102, and the RAM 103. The second determination unit 114 is configured to determine the multi-touch operation having been input to the information processing apparatus 100 based on the determination result of the first determination unit 113. The second determination unit 114 sends a determination notification to an output control unit 115. The output control unit 115 is by the CPU 101, the ROM 102, and the RAM 103. The output control unit 115 is configured to control an output-related functional unit to output a result of a multi-touch operation having been input by a user. In the present exemplary embodiment, the output control unit 115 generates a display image according to a multi-touch operation having been input. The output control unit 115 causes the touch panel display device 108 (i.e., the output apparatus) to display the generated image. In particular, in a case where a pinch operation has been input to the information processing apparatus 100, the output control unit 115 generates a display image, which corresponds to enlargement or reduction of the currently displayed image, and outputs the enlarged or reduced display image to the touch panel display device 108. Further, in a case where a multi-drag operation has been input to the information processing apparatus 100, the output control unit 115 generates a display image, which is different from the currently displayed image, and outputs the generated image to the touch panel display device 108.

FIG. 2 is a flowchart illustrating an example flow of multi-touch operation recognizing processing that can be performed by the information processing apparatus 100. The processing of the flowchart illustrated in FIG. 2 can be launched in response to a notification from the input interface 105, which informs a touch point detected by the touch panel. Further, the processing of the flowchart illustrated in FIG. 2 can be launched in response to a notification from the input interface 105, which informs no detection of the touch point detected by the touch panel.

First, in step S201, the detection unit 111 performs touch point detection processing. The detection unit 111 acquires touch point related information notified from the input interface 105 based on the information detected by the touch panel. Further, the detection unit 111 stores the touch point related information in association with ID that is allocated to each detected touch point. In the present exemplary embodiment, it is presumed that the touch point information is stored in the RAM 103.

Next, in step S202, the acquisition unit 112 determines whether a plurality of touch points has been detected by the touch panel. If it is determined that the number of the touch points is two or more, the operation proceeds to step S203. On the other hand, if it is determined that the number of the touch points is only one or zero, the information processing apparatus 100 terminates the processing of the flowchart illustrated in FIG. 2.

In step S203, the acquisition unit 112 acquires the distance between two of the detected touch points. The acquisition unit 112 refers to information relating to each touch point stored in the detection unit 111 and calculates (and acquires) the distance between two points with reference to coordinate information indicating the positions of two touch points.

In step S204, the acquisition unit 112 determines whether the two-point distance acquiring processing for the touch points of the detected ID has been first performed. The two-point distance acquiring processing, if it is first performed after touch points that constitute a multi-touch operation are first detected, is referred to as initial processing. If it is determined that the two-point distance acquiring processing has been first performed (YES in step S204), the operation proceeds to step S205. If it is determined that the two-point distance acquiring processing is not the first processing (NO in step S204), the operation proceeds to step S206.

In step S205, the information processing apparatus 100 stores the distance between two points acquired by the acquisition unit 112 as an initial distance and a reference distance. In the present exemplary embodiment, it is presumed that the RAM 103 is usable to store the acquired distance information. The information processing apparatus 100 terminates the initial processing when the storage of the initial distance and the reference distance has been completed.

On the other hand, in step S206, the first determination unit 113 determines whether the absolute value of the difference between the two-point distance acquired by the acquisition unit 112 and the reference distance stored in the RAM 103 is greater than a threshold value "a." The absolute value of the difference between the two-point distance acquired by the acquisition unit 112 and the reference distance stored in the RAM 103 corresponds to a change amount in the two-point distance that has been caused by a user's operation. The threshold value "a" is a threshold value that represents the magnitude of distance registered beforehand in the information processing apparatus 100. In the present exemplary embodiment, if the change amount in the two-point distance is equal to or greater than the threshold value "a", the information processing apparatus 100 recognizes that the user has performed a pinch operation by increasing or decreasing the distance between two touch points. If it is determined that the absolute value of the difference between the two-point distance and the reference distance is greater than the threshold value "a" (YES in step S206), the operation proceeds to step S207. On the other hand, if it is determined that the absolute value of the difference between the two-point distance and the reference distance is equal to or less than the threshold value "a" (NO in step S206), the operation proceeds to step S214.

In step S207, the first determination unit 113 determines whether the difference between the two-point distance acquired by the acquisition unit 112 and the reference distance stored in the RAM 103 is less than 0. The difference between the two-point distance acquired by the acquisition unit 112 and the reference distance stored in the RAM 103 can be obtained by subtracting the previously acquired and stored reference distance from the two-point distance acquired in the present processing. Accordingly, when the difference between the two-point distance and the reference distance is less than 0, it means that the two-point distance acquired in the present processing is smaller than the previously acquired and stored reference distance. More specifically, it means that the user has reduced the distance between two touch points. If it is determined that the difference between the two-point distance and the reference distance is less than 0 (YES in step S207), the operation proceeds to step S208. On the other hand, if it is determined that the difference between the two-point distance and the reference distance is equal to or greater than 0 (NO in step S207), the operation proceeds to step S211.

In step S208, the first determination unit 113 reads the number of pinch-in actions Nin and the number of pinch-out actions Nout. The first determination unit 113 increments Nin to Nin+1 and initializes Nout to 0. Then, the first determination unit 113 stores the updated values of the number of pinch-in actions Nin and the number of pinch-out actions Nout. In the present exemplary embodiment, the number of pinch-in actions Nin is a value indicating the number of times a pinch-in operation that reduces the distance between two touch points has been continuously detected by detecting a movement of each touch point. On the other hand, the number of pinch-out actions Nout is a value indicating the number of times a pinch-out operation that increases the distance between two points has been continuously detected. It is presumed that the first determination unit 113 stores respective values of the number of pinch-in actions Nin and the number of pinch-out actions Nout in the RAM 103.

Then, in step S209, the first determination unit 113 determines whether the number of pinch-in actions Nin stored in the RAM 103 is equal to or greater than a predetermined number of times. The predetermined number of times is a value registered beforehand in the information processing apparatus 100 to determine the starting of an input of the pinch (i.e., pinch-in or pinch-out) operation. It is presumed that the first determination unit 113 stores the predetermined number of times in the RAM 103. In the present exemplary embodiment, the first determination unit 113 determines that the user has input the pinch-in operation only when the pinch-in actions have been continuously detected the predetermined number of times. Performing the above-described processing is useful to prevent the displayed image reduction processing from being immediately performed in response to a detection of temporary reduction in the distance between two points in a case where acquisition of information relating to touch points that constitute a multi-touch operation is performed one by one. If it is determined that the number of pinch-in actions Nin is equal to or greater than the predetermined number of times (YES in step S209), the operation proceeds to step S210. On the other hand, if it is determined that the number of pinch-in actions Nin is less than the predetermined number of times (NO in step S209), the operation proceeds to step S214.

In step S210, the second determination unit 114 receives the determination result from the first determination unit 113 and determines that the operation having been input to the information processing apparatus 100 is the pinch-in operation. The second determination unit 114 sends a determination notification to the output control unit 115. The output control unit 115 generates a display image in such a way as to reflect a change amount in the distance between two points, as a reduced version of the image displayed on the touch panel display device 108 before the user's operation. The output control unit 115 outputs the generated display image.

On the other hand, in step S211, the first determination unit 113 reads the number of pinch-out actions Nout and the number of pinch-in actions Nin. Then, the first determination unit 113 increments Nout to Nout+1 and initializes Nin to 0. Further, the first determination unit 113 stores the updated values of the number of pinch-out actions Nout and the number of pinch-in actions Nin.

Then, in step S212, the first determination unit 113 determines whether the number of pinch-out actions Nout stored in the RAM 103 is equal to or greater than a predetermined number of times. Similar to step S209, in the present exemplary embodiment, the first determination unit 113 determines that the user has input the pinch-out operation only when the pinch-out actions have been continuously detected the predetermined number of times. Performing the above-described processing is useful to prevent the displayed image enlargement processing from being immediately performed in response to a detection of temporary enlargement in the distance between two points in a case where acquisition of information relating to touch points that constitute a multi-touch operation is performed one by one. If it is determined that the number of pinch-out actions Nout is equal to or greater than the predetermined number of times (YES in step S212), the operation proceeds to step S213. On the other hand, if it is determined that the number of pinch-out actions Nout is less than the predetermined number of times (NO in step S212), the operation proceeds to step S214.

In step S213, the second determination unit 114 receives the determination result from the first determination unit 113 and determines that the operation having been input to the information processing apparatus 100 is the pinch-out operation. The second determination unit 114 sends a determination notification to the output control unit 115. The output control unit 115 generates a display image in such a way as to reflect a change amount in the distance between two points, as a reduced version of the image displayed on the touch panel display device 108 before the user's operation. The output control unit 115 outputs the generated display image.

In step S214, the first determination unit 113 determines whether a multi-touch operation other than the pinch operation has been input. In the present exemplary embodiment, the first determination unit 113 performs multi-drag determination processing to determine whether a multi-drag operation (i.e., an example of the multi-touch operation) has been input. The multi-drag determination processing to be performed in step S214 is described in detail below.

Then, in step S215, the acquisition unit 112 stores the two-point distance acquired in step S203 as the reference distance. In the present exemplary embodiment, the RAM 103 is usable to store the reference distance information. The information processing apparatus 100 terminates the processing illustrated in FIG. 2 when the storage of the reference distance has been completed. As described above, the information processing apparatus 100 in the present exemplary embodiment can perform processing for recognizing a user's multi-touch operation.

FIG. 3 is a flowchart illustrating an example flow of the multi-drag determination processing to be executed in step S214. First, in step S301, the first determination unit 113 acquires the touch point movement distance detected in step S201. The first determination unit 113 obtains the touch point movement distance with reference to the information indicating the previously detected touch point position, which is stored in the RAM 103, and the information indicating the presently detected position.

Next, in step S302, for at least one of the touch points, the first determination unit 113 determines whether the acquired movement distance is greater than a threshold value "b." In the present exemplary embodiment, the threshold value "b" is a threshold value that represents the magnitude of distance registered beforehand in the information processing apparatus 100. It is useful to set the threshold value "b" based on a minimum distance that is required for a user to move a touch point on the touch panel, to realize a multi-touch operation that can be recognized by the information processing apparatus 100. If it is determined that the movement distance is greater than the threshold value "b", the operation proceeds to step S303. On the other hand, if it is determined that the movement distance is equal to or less than the threshold value "b", the first determination unit 113 terminates the processing of the flowchart illustrated in FIG. 3. In the present exemplary embodiment, if the touch point movement distance is greater than the threshold value "b", the first determination unit 113 determines whether the input multi-touch operation is the multi-drag operation because it can be regarded that the user has moved the touch point to perform the multi-touch operation. If the touch point movement distance is less than the threshold value "b", it can be regarded that the user did not move any touch point and it is unnecessary to identify the input multi-touch operation. Therefore, the first determination unit 113 terminates the processing of the flowchart illustrated in FIG. 3 and returns to the main processing (i.e., the flowchart illustrated in FIG. 2) to continue the processing for recognizing the user's multi-touch operation.

Next, in step S303, the first determination unit 113 determines whether the absolute value of the difference between the two-point distance acquired by the acquisition unit 112 in step S203 and the initial distance is less than a threshold value "c." The first determination unit 113 reads the two-point distance acquired by the acquisition unit 112 and the stored initial distance from the RAM 103 and obtains the absolute value of the difference between the readout distance values. The absolute value of the difference between compared values obtained in this case represents a change amount in the distance between two points, in comparison with an initial state where the touch panel has been touched by the user. The threshold value "c" is a threshold value that represents the magnitude of distance registered beforehand in the information processing apparatus 100. In the present exemplary embodiment, if it is determined that the absolute value of the difference between the two-point distance and the initial distance is less than the threshold value "c" (YES in step S303), the operation proceeds to step S304 because it can be regarded that the distance between two points is retained at substantially the same value. On the other hand, if it is determined that the absolute value of the difference between the two-point distance and the initial distance is equal to or greater than the threshold value "c" (NO in step S303), the first determination unit 113 terminates the processing of the flowchart illustrated in FIG. 3 and returns to the main processing (i.e., the flowchart illustrated in FIG. 2) to continue the processing for recognizing the user's multi-touch operation. In this case, in the present exemplary embodiment, it is useful to perform the multi-drag determination processing on a touch point detected after the distance between two points becomes once substantially constant and determine that the multi-drag operation has been input if the two-point distance and the initial distance become substantially constant. However, for example, if the distance between two points substantially varies after a multi-drag operation has been once input, it is useful to set a cancellation flag indicating that the user has cancelled the multi-drag operation and then stop the multi-drag determination processing. The cancellation flag can be nullified in response to an input of touch point information indicating user touching operation on the touch panel to start the next operation.

In the present exemplary embodiment, if a user moves two touch points while maintaining the distance between them at substantially the same value, it is determined that the user intends to perform a multi-drag operation. Therefore, in step S304, the second determination unit 114 determines that the operation having been input to the information processing apparatus 100 is the multi-drag operation and sends a determination notification to the output control unit 115. Then, the operation returns to the main processing (i.e., the flowchart illustrated in FIG. 2) to continue the processing for recognizing the user's multi-touch operation. As described above, the information processing apparatus 100 according to the present exemplary embodiment performs the multi-drag determination processing in step S214.

As described above, the information processing apparatus 100 according to the present exemplary embodiment determines that a pinch operation has been input only when the enlargement or reduction of the distance between two points has been continuously detected at least a predetermined number of times. If the distance between two points has not been continuously enlarged or reduced the predetermined number of times, the information processing apparatus 100 determines whether a multi-touch operation other than the pinch operation has been input. Performing the above-described processing is useful to prevent the displayed image enlargement/reduction processing from being immediately performed in response to a detection of temporary variation in the distance between two points in a case where acquisition of information relating to touch points that constitute a multi-touch operation is performed one by one. Accordingly, in a case where a user moves two touch points in the same direction while maintaining the distance between them at substantially the same value, the information processing apparatus 100 does not detect an erroneous input of a pinch operation. Therefore, it is feasible to prevent the display magnification of a displayed image from being unintentionally changed due to an erroneous operation.

In the present exemplary embodiment, the input interface 105 refers to information relating to a plurality of touch points detected by the touch panel (i.e., the input apparatus) at constant intervals and sequentially sends a notification signal to the detection unit 111 in response to acquisition of information relating to each point. As described above, the information processing apparatus 100 according to the present exemplary embodiment performs touch operation recognizing processing each time when the latest touch point information is acquired for at least one point. Thus, the information processing apparatus 100 can promptly output a response to the touch operation. On the other hand, an erroneous pinch operation may be recognized unwontedly as described above because a temporary variation in the distance between two touch points can be easily detected. Such a problem may occur, for example, when touch point information detectable for each point during a scanning operation performed at constant intervals for a touch point detection area of a touch panel is notified and the input interface 105 sequentially sends the acquired touch point information to the detection unit 111. To solve the above-described problem, the information processing apparatus 100 recognizes a pinch operation by checking whether any enlargement or reduction in the distance between two points has been continuously detected, as described in the present exemplary embodiment.

Figure 4B:
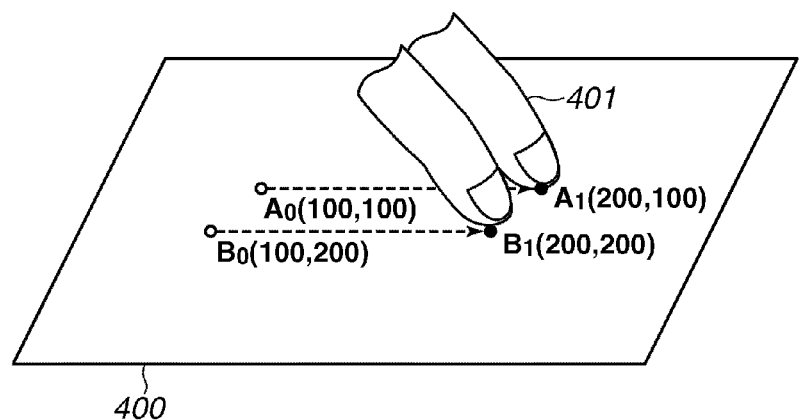
Figure 4C:
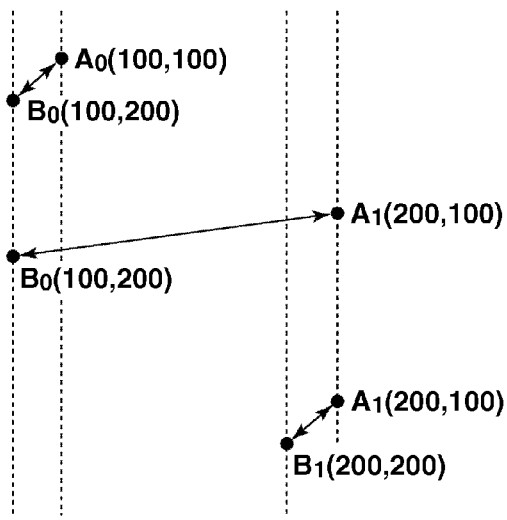
FIG. 4C illustrates an example of a stepwise transition of two touch points detected in the multi-drag operation.

An operational example 1, in which a user operates the information processing apparatus 100 according to the first exemplary embodiment, is described below. FIGS. 4A, 4B, and 4C illustrate an example of a plurality of touch points that constitutes a multi-drag operation. FIGS. 4A and 4B illustrate an example movement of two touch points during the multi-drag operation. It is now presumed that coordinate values of each touch point in the coordinate system are defined in the following manner. The upper left corner of an input area 400 is set as the origin. In the coordinate system applied to the input area 400, the x coordinate represents the position of each finger touch in the horizontal direction. The y coordinate represents the position of each finger touch in the vertical direction. The coordinate values are expressed in units of "dots" considering the screen resolution of the touch panel display device.

In the operational example 1, the threshold value "a" to be referred to in determining whether the distance between two points touched by a user has been enlarged or reduced is set to 30 dots. The predetermined number of times to be referred to in determining the starting of a pinch (i.e., pinch-in or pinch-out) operation is set to 2, as described below. Further, the threshold value "b" to be referred to in determining whether a user has moved a touch point to perform an operation is set to 20 dots. The threshold value "c" to be referred to in determining whether the distance between two points is retained is set to 10 dots.

First, the information processing apparatus 100 starts the multi-touch operation recognizing processing (i.e., the flowchart illustrated in FIG. 2) in response to a notification of information relating to a touch point $A_0$ from the input interface 105. In step S201, the detection unit 111 detects the touch point $A_0$. The detection unit 111 obtains X coordinate $A_0x=100$ and Y coordinate $A_0y=100$, as information indicating the coordinate position of the touch point $A_0$, as well as information indicating the detection time, and stores the obtained information in association with ID=1. Hereinafter, if touch point information is newly notified, then in step S201, the detection unit 111 stores the notified touch point information with reference to ID. In step S202, the acquisition unit 112 determines whether the number of touch points is two or more. The touch point detected at this moment is only one point (i.e., the touch point $A_0$). Therefore, the operation proceeds to the branch NO. In this case, the information processing apparatus 100 terminates the processing of the flowchart illustrated in FIG. 2.

Next, the information processing apparatus 100 starts the processing of the flowchart illustrated in FIG. 2 in response to a notification of information relating to a touch point $B_0$ from the input interface 105. In step S201, the detection unit 111 detects the touch point $B_0$. The detection unit 111 obtains and stores information relating to the touch point $B_0$ (ID=2). In step S202, the number of touch points detected at this moment is two points (i.e., a plurality of points), i.e., the touch point $A_0$ and the touch point $B_0$. Therefore, the operation proceeds to the branch YES. Therefore, in step S203, the acquisition unit 112 acquires the two-point distance between the touch point $A_0$ and the touch point $B_0$. In this case, the two-point distance can be obtained using the following formula.

$$\sqrt{\{(B_0x-A_0x)*(B_0x-A_0x)+(B_0y-A_0y)*(B_0y-A_0y)\}} = \sqrt{\{(100-100)*(100-100)+(200-100)*(200-100)\}} = 100[\text{dots}]$$

Accordingly, the distance between the touch point $A_0$ (100, 100) and the touch point $B_0$ (100, 200) can be obtained as 100 dots. The two-point distance acquired by the acquisition unit 112 in this case is indicated by the uppermost arrow in FIG. 4C. In step S204, the acquisition unit 112 identifies that the two-point distance acquiring processing has been first performed. Therefore, the operation proceeds to the branch YES. Thus, in step S205, the information processing apparatus 100 stores the acquired two-point distance (=100 dots) as an the initial distance and the reference distance in the RAM 103. Then, the information processing apparatus 100 terminates the processing of the flowchart illustrated in FIG. 2.

FIG. 4B illustrates an example state of two fingers 401, which have moved from the state illustrated in FIG. 4A. The uppermost step illustrated in FIG. 4C expresses a stepwise transition of coordinate positions of the touch points detected in this case. In FIG. 4B, two fingers 401 are positioned at points $A_1$ (200, 100) and $B_1$ (200, 200). The information processing apparatus 100 sequentially detects these touch points. Accordingly, at the notification timing of information relating to the touch point $A_1$ (ID=1), the information processing apparatus 100 restarts the flowchart illustrated in FIG. 2.

In step S201, the detection unit 111 detects the touch point $A_1$. The detection unit 111 updates the touch point information stored in association with ID=1 and stores the presently detected positional information together with the previously detected positional information.

In step S202, the number of the touch points detected at this moment is two (i.e., the touch point $B_0$ and the touch point $A_1$). Therefore, the operation proceeds to the branch YES. In step S203, the acquisition unit 112 acquires the two-point distance between the touch point $B_0$ and the touch point $A_1$. In this case, the two-point distance can be obtained using the following formula.

$$\sqrt{\{(A_1x-B_0x)*(A_1x-B_0x)+(A_1y-B_0y)*(A_1y-B_0y)\}} = \sqrt{\{(200-100)*(200-100)+(100-200)*(100-200)\}} \approx 141.4[\text{dots}]$$

The two-point distance calculated in this case is indicated by the middle arrow in FIG. 4C. At this timing, the acquisition of the distance between the touch point of ID=1 and the touch point of ID=2 is the second time. Therefore, the acquisition unit 112 determines NO in step S204. The operation proceeds to step S206.

In step S206, the first determination unit 113 obtains the difference between the two-point distance (=141.4 dots) acquired in step S203 and the reference distance (=100 dots) and determines that the absolute value of the obtained difference (=41.4 dots) is greater than the threshold value (=30 dots). Therefore, the operation proceeds to the branch YES. In step S207, the first determination unit 113 subtracts the reference distance from the two-point distance acquired in step S203 and determines that the obtained difference (=41.4 dots) is a positive value. Therefore, the operation proceeds to the branch NO. It means that the presently obtained two-point distance is greater than the previously obtained two-point distance. Therefore, the first determination unit 113 identifies an enlargement in the two-point distance (i.e., an occurrence of a pinch-out action).

In step S211, the first determination unit 113 increments the number of pinch-out actions Nout by one and initializes the number of pinch-in actions Nin to 0. At this moment, Nout is set to 1 (Nout=1) because the pinch-out action has been first detected.

In step S212, the first determination unit 113 determines that the number of pinch-out actions is equal to 1 and is smaller than the predetermined number of times (=2) set in the operational example 1. Therefore, the operation proceeds to the branch NO. In this case, in step S214, the first determination unit 113 performs the multi-drag determination processing.

First, in step S301, the first determination unit 113 acquires the movement distance of the touch point $A_1$ (i.e., the touch point of ID=1) detected in the present processing. At this moment, the touch point of ID=1 has already moved from the touch point $A_0$ to the touch point $A_1$. Therefore, the first determination unit 113 determines that the movement distance is equal to 100 dots. In step S302, the acquired movement distance (=100 dots) is greater than the threshold value "b" (=20 dots) having been set beforehand. Therefore, the operation proceeds to the branch YES. In step S303, the first determination unit 113 obtains the difference between the two-point distance (=141.4 dots) acquired by the acquisition unit 112 in step S203 and the stored initial distance (=100 dots). In this case, the absolute value of the obtained difference (=41.4 dots) is greater than the threshold value "c" (=10 dots). Therefore, the first determination unit 113 determines that the distance between two touch points is not retained at the constant value. Thus, the operation proceeds to the branch NO and returns to the flowchart illustrated in FIG. 2.

In step S215, the acquisition unit 112 stores the two-point distance (=141.4 dots) acquired in step S203 as the reference distance and terminates the processing of the flowchart illustrated in FIG. 2. In the present processing, the information processing apparatus 100 does not determine that an input of the pinch-out operation has started, although the occurrence of a pinch-out action was recognized, and waits for the next processing.

Next, the information processing apparatus 100 restarts the processing of the flowchart illustrated in FIG. 2 in response to a notification of information relating to the touch point $B_1$ (ID=2). In step S201, the detection unit 111 detects the touch point $B_1$ and updates the touch point information of ID=2. In step S202, the number of touch points detected at this moment is two points (i.e., the touch point $A_1$ and the touch point $B_1$). Therefore, the operation proceeds to the branch YES. In step S203, the acquisition unit 112 acquires the two-point distance between the touch point $A_1$ and the touch point $B_1$. In this case, the two-point distance can be obtained using the following formula.

$$\sqrt{\{(B_1x-A_1x)*(B_1x-A_1x)+(B_1y-A_1y)*(B_1y-A_1y)\}} = \sqrt{\{(200-200)*(200-200)+(100-200)*(100-200)\}} = 100 [dots]$$

The two-point distance obtained in this case is indicated by the lowermost arrow in FIG. 4C. At this timing, the acquisition of the distance between the touch point of ID=1 and the touch point of ID=2 is the second time. Therefore, the operation proceeds to the branch NO. In step S206, the first determination unit 113 obtains the difference between the two-point distance (=100 dots) acquired in step S203 and the stored reference distance (=141.4 dots) and determines that the absolute value of the obtained difference (=41.4 dots) is greater than the threshold value "a" (=30 dots). Therefore, the operation proceeds to the branch YES.

Next, in step S207, the first determination unit 113 subtracts the reference distance (=141.4 dots) from the two-point distance (=100 dots) and determines that the obtained difference (=−41.4) is a negative value (i.e., a value smaller than 0). Therefore, the operation proceeds to the branch YES. It means that the presently acquired two-point distance is smaller than the previously acquired two-point distance. Therefore, the first determination unit 113 identifies a reduction in the two-point distance (i.e., an occurrence of a pinch-in action). In step S208, the first determination unit 113 increments the number of pinch-in actions Nin by one and initializes the number of pinch-out actions Nout to 0. At this moment, Nin is set to 1 (Nin=1) because the pinch-in action has been first detected. In step S209, the first determination unit 113 determines that the number of pinch-in actions Nin is equal to 1 and is smaller than the predetermined number of times (=2). The operation proceeds to the branch NO. Accordingly, in step S214, the first determination unit 113 performs the multi-drag determination processing.

First, in step S301, the first determination unit 113 acquires the movement distance of the touch point $B_1$ (i.e., the touch point of ID=2) detected in the present processing. At this moment, the touch point of ID=2 has already moved from the touch point $B_0$ to the touch point $B_1$. Therefore, the first determination unit 113 determines that the movement distance is equal to 100 dots. In step S302, the acquired movement distance (=100 dots) is greater than the threshold value "b" (=20 dots) having been set beforehand. Therefore, the operation proceeds to the branch YES. In step S303, the first determination unit 113 obtains the difference between the two-point distance (=100 dots) acquired by the acquisition unit 112 in step S203 and the stored initial distance (=100 dots). In this case, the obtained difference is equal to 0 and is less than the threshold value "c" (=10 dots). Therefore, the first determination unit 113 determines that the distance between two touch points is retained at the constant value. The operation proceeds to the branch YES. Thus, in step S304, the second determination unit 114 determines that the multi-drag operation has been input and sends a determination notification to the output control unit 115. The output control unit 115 generates a display image of a specific image, which is different from the image displayed on touch panel display device 108 before an operation is input, and causes the touch panel display device 108 to display the generated image when the user's touch is entirely released. If the second determination unit 114 recognizes an input of the multi-drag operation, the operation returns to the flowchart illustrated in FIG. 2.

In step S215, the acquisition unit 112 stores the two-point distance (=100 dots) acquired in step S203 as the reference distance and terminates the processing of the flowchart illustrated in FIG. 2. In the present processing, the information processing apparatus 100 does not recognize the starting of an input of the pinch-in operation, although the occurrence of a pinch-in action can be detected. The information processing apparatus 100 determines that the multi-drag determination processing has been performed and the multi-drag operation has been input. After that, even if the multi-drag operation is continuously input, the information processing apparatus 100 repeats the processing performed in the detection of the touch point $A_1$ and the touch point $B_1$. Thus, the information processing apparatus 100 does not recognize the starting of an input of the pinch operation regardless of the occurrence of a pinch-out or pinch-in action.

As described above, in a case where the present exemplary embodiment is applied to an information processing apparatus that enables a user to perform a multi-touch operation, the apparatus can prevent a multi-drag operation from being recognized as an input of the pinch operation. Therefore, the repetitive enlargement/reduction of a displayed image during an operation that deteriorates the visibility does not occur.

Next, some examples of the pinch operation that can be performed by a user using the information processing apparatus 100 according to the first exemplary embodiment are described below. FIGS. 5A, 5B, 5C, and 5D illustrate example movements of two touch points in the pinch operation, in which a user gradually changes the two-point distance while moving the touch points in substantially the same direction. More specifically, the user inputs a pinch operation in such a way as to perform an enlargement/reduction operation while scrolling a displayed image.

Figure 5A:
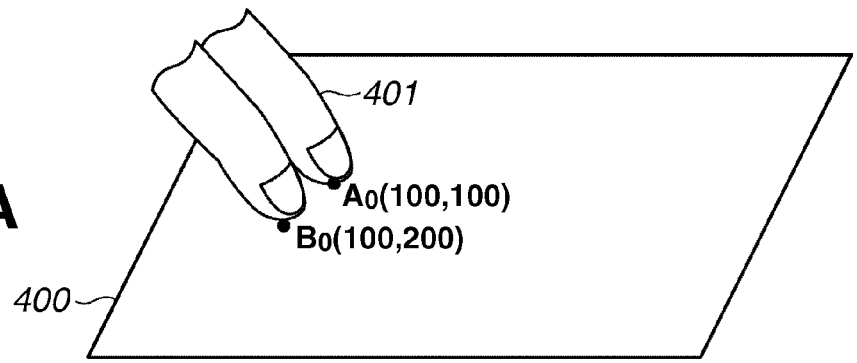
FIGS. 5A and 5B illustrate an example movement of two touch points in a pinch-out operation.
Figure 5B:
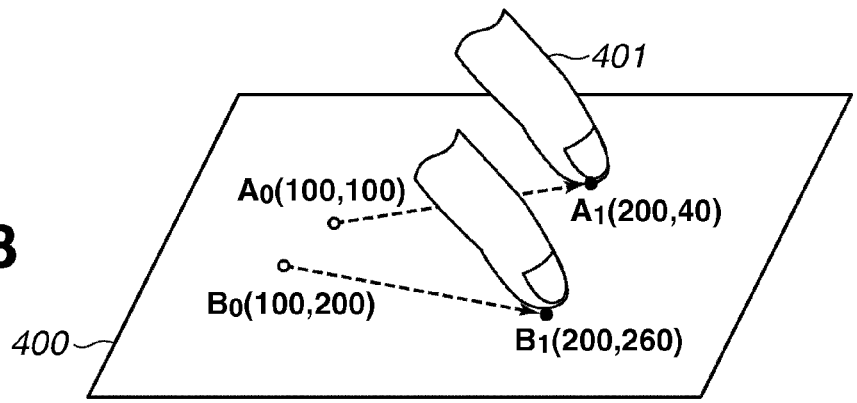

First, an operational example 2 in which a user inputs a pinch-out operation is described below. FIGS. 5A and 5B illustrate an example movement of two touch points in the pinch-out operation, in which the user instructs gradually increasing the display magnification while the user performs a scrolling operation on the displayed image. In FIGS. 5A, 5B, 5C, and 5D, it is presumed that coordinate values of each touch point in the coordinate system is defined in the following manner. The upper left corner of the input area 400 is set as the origin. In the coordinate system applied to the input area 400, the x coordinate represents the position of each finger touch in the horizontal direction. The y coordinate represents the position of each finger touch in the vertical direction. The coordinate values are expressed in units of "dots" considering the screen resolution of the touch panel display device.

In the operational example 2, the threshold value "a" to be referred to in determining whether the distance between two points touched by a user has been enlarged or reduced is set to 30 dots. The predetermined number of times to be referred to in determining the starting of a pinch (i.e., pinch-in or pinch-out) operation is set to 2, as described below. Further, the threshold value "b" to be referred to in determining whether a user has moved a touch point to perform an operation is set to 20 dots. The threshold value "c" to be referred to in determining whether the distance between two points is retained is set to 10 dots.

First, processing to be applied to the state illustrated in FIG. 5A is similar to the processing described in the operational example 1 with reference to FIG. 4A and therefore the description thereof is not repeated. In this case, the information processing apparatus 100 stores the distance (=100 dots) between the touch point $A_0$ and the touch point $B_0$ as the initial distance and the reference distance, similar to the operational example 1.

FIG. 5B illustrates an example state of two fingers 401 that have moved from the state illustrated in FIG. 5A. In this case, the information processing apparatus 100 sequentially detects touch points $A_1$ (200, 40) and $B_1$ (200, 260) of the fingers 401 in this order. Accordingly, the information processing apparatus 100 starts the processing of the flowchart illustrated in FIG. 2 in response to a notification of information relating to the touch point $A_1$.

First, in step S201, the detection unit 111 detects the touch point $A_1$ (ID=1) and updates the touch point information of ID=1. The detection unit 111 stores the presently detected positional information together with the previously detected positional information. In step S202, the number of touch points detected at this moment is two points (i.e., the touch point $B_0$ and the touch point $A_1$). Therefore, the operation proceeds to the branch YES. In step S203, the acquisition unit 112 acquires the two-point distance between the touch point $B_0$ and the touch point $A_1$. In this case, the two-point distance can be obtained using the following formula.

$$\sqrt{\{(A_1x-B_0x)*(A_1x-B_0x)+(A_1y-B_0y)*(A_1y-B_0y)\}} = \sqrt{\{(200-100)*(200-100)+(40-200)*(40-200)\}} \approx 188.7 [\text{dots}]$$

At this moment, the acquisition of the distance between the touch point of ID=1 and the touch point of ID=2 is the second time. Therefore, the acquisition unit 112 determines NO in step S204. The operation proceeds to step S206. In step S206, the first determination unit 113 obtains the difference between the two-point distance (=188.7 dots) and the reference distance (=100 dots) and determines that the absolute value of the obtained difference (=88.7 dots) is greater than the threshold value "a" (=30 dots). Therefore, the operation proceeds to the branch YES.

In step S207, the first determination unit 113 subtracts the reference distance (=100 dots) from the two-point distance (=188.7 dots) and determines that the obtained difference (=88.7 dots) is a positive value (i.e., a value greater than 0). Therefore, the operation proceeds to the branch NO. It means that the two-point distance has been enlarged by a user. Processing to be performed in steps S211 and S212 is similar to the processing described in the operational example 1. In this case, the number of pinch-out actions Nout is equal to 1 and is smaller than the predetermined number of times. The information processing apparatus 100 does not recognize the starting of an input of the pinch-out operation. Therefore, in step S214, the first determination unit 113 performs the multi-drag determination processing.

In the multi-drag determination processing, in step S301, the first determination unit 113 acquires the movement distance of the touch point of ID=1, i.e., the distance between the touch point $A_0$ and the touch point $A_1$. In step S302, it is determined that the acquired movement distance (=116.6 dots) is greater than the threshold value "b" (=20 dots). Further, in step S303, it is determined that the difference between the two-point distance (=188.7 dots) and the initial distance (=100 dots) is greater than the threshold value "c" (=10 dots). Therefore, the information processing apparatus 100 does not recognize an input of the multi-drag operation. The operation returns to the flowchart illustrated in FIG. 2.

In step S215, the acquisition unit 112 stores the two-point distance (=188.7 dots) acquired in step S203 as the reference distance and terminates the processing of the flowchart illustrated in FIG. 2.

Next, the information processing apparatus 100 restarts the processing of the flowchart illustrated in FIG. 2 in response to notification information relating to the touch point $B_1$ (ID=2). In step S201, the detection unit 111 detects the touch point $B_1$ and updates the touch point information of ID=2. In step S202, the number of touch points detected at this moment is two points (i.e., the touch point $A_1$ and the touch point $B_1$). Therefore, the operation proceeds to the branch YES. In step S203, the acquisition unit 112 acquires the two-point distance between the touch point $A_1$ and the touch point $B_1$. In this case, the two-point distance can be obtained using the following formula.

$$\sqrt{\{(B_1x-A_1x)*(B_1x-A_1x)+(B_1y-A_1y)*(B_1y-A_1y)\}} = \sqrt{\{(200-200)*(200-200)+(260-40)*(260-40)\}} = 220 [\text{dots}]$$

At this moment, the acquisition of the distance between the touch point of ID=1 and the touch point of ID=2 is the second time. Therefore, the acquisition unit 112 determines NO in step S204. Thus, in step S206, the first determination unit 113 obtains the difference between the acquired two-point distance (=220 dots) and the reference distance (=188.7 dots) and determines that the absolute value of the obtained difference (=31.3 dots) is greater than the threshold value (=30 dots). Therefore, the operation proceeds to the branch YES. Further, in step S205, the difference (=31.3 dots) between the two-point distance and the reference distance is a positive value (i.e., a value greater than 0). Therefore, the operation proceeds to the branch NO. It means that the two-point distance has been enlarged by a user. Accordingly, in step S211, the first determination unit 113 increments the number of pinch-out actions Nout by one (i.e., Nout=2) and initializes the number of pinch-in actions Nin to 0. In step S212, the number of pinch-out actions Nout (=2) is equal to the predetermined number of times (=2). Therefore, the operation proceeds to the branch YES.

In step S213, the second determination unit 114 recognizes an input of the pinch-out operation and sends a determination notification to the output control unit 115. The output control unit 115 generates a display image to be displayed with reference to a change in the position of the user's finger 401 as well as a change in the two-point distance. The output control unit 115 outputs the generated display image to the touch panel display device 108. In step S215, the acquisition unit 112 stores the two-point distance acquired in step S203 as the reference distance and terminates the processing of the flowchart illustrated in FIG. 2. After that, if a newly input touch point $A_2$ is positioned on an extended line of the line segment that connects the touch point $A_0$ and the touch point $A_1$, the information processing apparatus 100 recognizes an input of the pinch-out operation as the number of pinch-out actions is already greater than the predetermined number of times. As described above, the information processing apparatus 100 recognizes an input of the pinch-out operation each time a continuous enlargement in the two-point distance is detected after the number of pinch-out actions Nout has reached the predetermined number of times.

As described above, when the present exemplary embodiment is applied to an information processing apparatus that enables a user to perform a multi-touch operation, the user can input a pinch-out operation for enlarging a displayed image while scrolling the displayed image by performing a manual operation for increasing the distance between two touch points while moving these touch points in substantially the same direction.

Figure 5C:
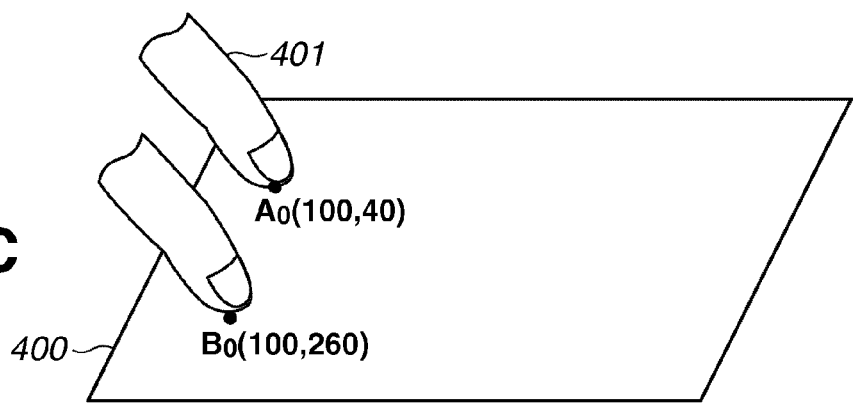
FIGS. 5C and 5D illustrate an example movement of two touch points in a pinch-in operation.
Figure 5D:
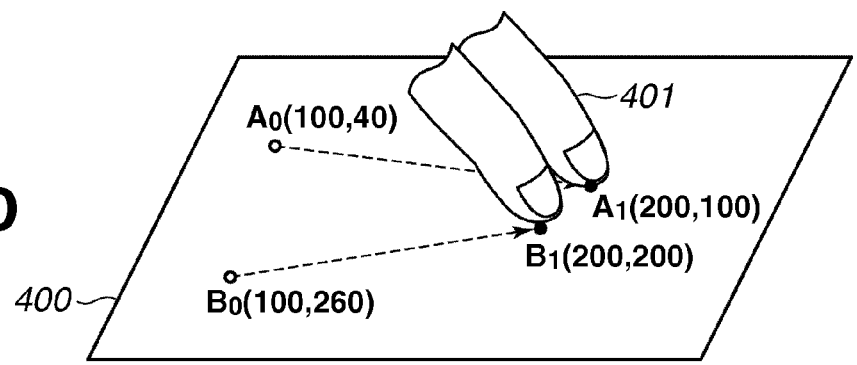

Next, an operational example 3 in which a user inputs a pinch-in operation is described below. FIGS. 5C and 5D illustrate an example movement of two touch points in the pinch-in operation, in which the user instructs gradually reducing the display magnification while the user performs a scrolling operation on the displayed image.

In the operational example 3, the threshold value "a" to be referred to in determining whether the distance between two points touched by a user has been enlarged or reduced is set to 30 dots. The predetermined number of times to be referred to in determining the starting of a pinch (i.e., pinch-in or pinch-out) operation is set to 2, as described below. Further, the threshold value "b" to be referred to in determining whether a user has moved a touch point to perform an operation is set to 20 dots. The threshold value "c" to be referred to in determining whether the distance between two points is retained is set to 10 dots.

FIG. 5C illustrates the positions of two fingers 401 at the time when the fingers 401 have first contacted the input area 400. Similar to the operational example 1 and the operational example 2, it is presumed that the detection unit 111 sequentially detects a touch point $A_0$ (100, 40) and a touch point $B_0$ (100, 260) in this order. In the operational example 3, the information processing apparatus 100 starts the processing of the flowchart illustrated in FIG. 2 in response to a notification of touch point information of one point from the input interface 105. However, detailed contents of respective processing steps are similar to those described in the operational examples 1 and 2 and therefore the descriptions thereof are not repeated. Processing to be applied to the state illustrated in FIG. 5C is similar to the processing described with reference to FIG. 4A. In step S205, the information processing apparatus 100 stores the distance (=220 dots) between the touch point $A_0$ and the touch point $B_0$ as the initial distance and the reference distance.

FIG. 5D illustrates an example state of two fingers 401 that have moved from the state illustrated in FIG. 5C. In this case, the information processing apparatus 100 sequentially detects touch points $A_1$ (200, 100) and $B_1$ (200, 200) of the fingers 401 in this order. Accordingly, the information processing apparatus 100 starts the processing of the flowchart illustrated in FIG. 2 in response to a detection of the touch point $A_1$ (ID=1). In step S203, the information processing apparatus 100 acquires the two-point distance (=188.8 dots) between the touch point $B_0$ and the touch point $A_1$. Further, it is determined that the absolute value of the difference between the acquired two-point distance (=188.8 dots) and the reference distance (=220 dots) is equal to 31.2 dots. Therefore, it is determined that the acquired absolute value is greater than the threshold value "a" (=30 dots) (YES in step S206). Further, the difference obtainable by subtracting the reference distance (=220 dots) from the acquired two-point distance (=188.8 dots) is equal to −31.2, which is a negative value (i.e., a value smaller than 0). Thus, the information processing apparatus 100 determines that the user has reduced the two-point distance (YES in step S207). Accordingly, in step S208, the information processing apparatus 100 increments the number of pinch-in actions Nin by one and initializes the number of pinch-out actions Nout to 0. At the detection timing of the touch point $A_1$, it is determined that the number of pinch-in actions (Nin=1) is smaller than the predetermined number of times (NO in step S209). Therefore, in step S214, the information processing apparatus 100 performs the multi-drag determination processing because there is not any input of the pinch-in operation currently started. In the multi-drag determination processing, it is determined that the movement distance (=116.6 dots) from the touch point $A_0$ to the touch point $A_1$ is greater than the threshold value "b" (=20 dots) (YES in step S302). However, it is determined that the absolute value (=31.2 dots) of the difference between the two-point distance (=188.8 dots) and the initial distance (=220 dots) is greater than the threshold value "c" (=10 dots) (NO in step S303). Accordingly, the information processing apparatus 100 does not recognize any input of the multi-drag operation. The operation returns to the flowchart illustrated in FIG. 2. Then in step S215, the detection unit 111 stores the two-point distance (=188.8 dots) as the reference distance.

Subsequently, the information processing apparatus 100 starts the processing of the flowchart illustrated in FIG. 2 in response to a detection of the touch point $B_1$ (ID=2). In step S203, the information processing apparatus 100 acquires the two-point distance (=100 dots) between the touch point $A_1$ and the touch point $B_1$. Further, it is determined that the absolute value of the difference between the acquired two-point distance (=100 dots) and the reference distance (=188.8 dots) is equal to 88.8 dots. Therefore, it is determined that the acquired absolute value is greater than the threshold value "a" (=30 dots) (YES in step S206). Further, the difference obtainable by subtracting the reference distance (=188.8 dots) from the acquired two-point distance (=100 dots) is equal to −88.8, which is a negative value (i.e., a value smaller than 0). Thus, the information processing apparatus 100 determines that the user has reduced the two-point distance (YES in step S207). Accordingly, in step S208, the information processing apparatus 100 increments the number of pinch-in actions Nin by one and initializes the number of pinch-out actions Nout to 0. At detection timing of the touch point $B_1$, it is determined that the number of pinch-in actions (Nin=2) is equal to the predetermined number of times (YES in step S209). Therefore, in step S210, the second determination unit 114 recognizes an input of the pinch-in operation. The output control unit 115 generates a display image to be displayed with reference to a positional change of the finger 401 moved by the user and a change in the two-point distance, and outputs the generated display image to the touch panel display device 108. In step S215, the information processing apparatus 100 stores the two-point distance (=100 dots) acquired by the acquisition unit 112 as the reference distance and terminates the processing of the flowchart illustrated in FIG. 2. After that, the information processing apparatus 100 recognizes an input of the pinch-in operation each time a continuous reduction in the two-point distance is detected because the number of pinch-in actions Nin is already equal to or greater than the predetermined number of times (=2).

As described above, when the present exemplary embodiment is applied to an information processing apparatus that enables a user to perform a multi-touch operation, the user can input a pinch-in operation for reducing a displayed image while scrolling the displayed image by performing a manual operation for decreasing the distance between two touch points while moving these touch points in substantially the same direction.

Further, in the operational example 2 and the operational example 3, the predetermined number of times to be referred to in determining a pinch-in operation and the predetermined number of times to be referred to in determining a pinch-out operation are set to the same value (=2). However, the predetermined number of times to be referred to in determining a pinch-in operation can be differentiated from the predetermined number of times to be referred to in determining a pinch-out operation. For example, if the two-point distance is relatively longer immediately after a user has touched two points, there is the higher possibility that the user performs a pinch-in operation. Therefore, it is useful to set a smaller value (e.g., one time) as the number of times to be referred to in determining a pinch-in operation and set a larger value (e.g., two times) as the number of times to be referred to in determining a pinch-out operation. To the contrary, if the two-point distance is relatively smaller immediately after a user has touched two points, there is the higher possibility that the user performs a pinch-out operation. Therefore, it is useful to set a smaller value (e.g., one time) as the number of times to be referred to in determining a pinch-out operation and set a larger value (e.g., two times) as the number of times to be referred to in determining a pinch-in operation. Further, it is useful to change the threshold value "a" to be referred to in determining whether the distance between two points touched by a user has been enlarged or reduced based on the number of continuous occurrences of the pinch actions. For example, it is useful to set the threshold value "a" to a smaller value if two pinch (i.e., pinch-in or pinch-out) actions continuous occur, compared to a case where only one pinch (i.e., pinch-in or pinch-out) action occur. Further, it is useful to retain or gradually reduce the same threshold value "a" for the third and subsequent pinch (i.e., pinch-in or pinch-out) actions if they continuously occur. When the above-described settings are employed, erroneous operations that may occur when enlargement and reduction occur alternately can be reduced. Further, the two-point distance required to recognize a pinch operation can be reduced, and the response in each pinch operation can be improved.

In the present exemplary embodiment, the number of points to be input is not limited to only two. For example, three points or more can be input. The processing described in the present exemplary embodiment is applicable to selected two of three touch points. In this case, it is useful to extract two points if the distance between them is smallest or largest. Further, it is useful to obtain a sum (or a mean value) of two-point distances between three or more touch points and use the obtained value in the processing described in the present exemplary embodiment.

As described above, the information processing apparatus 100 according to the present exemplary embodiment recognizes an input of a pinch operation when a user inputs a multi-touch operation if the number of times the distance between touch points that constitute the multi-touch operation has been enlarged or reduced continuously has exceeded the predetermined number of times. Accordingly, the detected touch point information can be updated for each point. The information processing apparatus 100 does not immediately start a pinch operation even when the two-point distance changes temporarily. Thus, it is feasible to eliminate erroneous operations, such as unwontedly repeated enlargements and reductions of the displayed image.

Further, the example multi-touch operation described in the present exemplary embodiment is an input of a user's multi-drag operation in which the user moves two touch points in the same direction while retaining the distance between two touch points at substantially the same value. In the multi-drag operation, it is presumed that the information processing apparatus can specify an image that is different from the image displayed on the touch panel display device before the input of the user's operation and can cause the touch panel display device to display the specified image. Similarly, when the present exemplary embodiment is employed in a case where a user inputs another multi-touch operation, such as an instruction of the scrolling (or rotation) of a currently displayed image, with a plurality of fingers, it is feasible to eliminate an erroneous recognition of a pinch operation. In this case, in step S214, the information processing apparatus 100 performs processing for identifying an input of a non-pinch multi-touch operation.

In the first exemplary embodiment, the information processing apparatus 100 does not recognize an input of a pinch operation unless the pinch (i.e., pinch-in or pinch-out) actions continuously occur the predetermined number of times. Therefore, the timing when the information processing apparatus 100 can recognize an input of the pinch operation and output a recognition result may be delayed significantly if the predetermined number of times is set inappropriately. To solve the above-described problem, a modified example that can change the predetermined number of times according to a situation to be considered in such a way as to prevent the execution of a pinch operation from being delayed is described below.

First, as a modified example 1 according to the first exemplary embodiment, in a case where the two-point distance is large at the time when a user has started the touch, the information processing apparatus 100 can change the predetermined number of times to be referred to with respect to continuous detections in determining the start of an input of the pinch (i.e., pinch-out or pinch-in) operation to a smaller number of times, as described below.

Figure 6A:
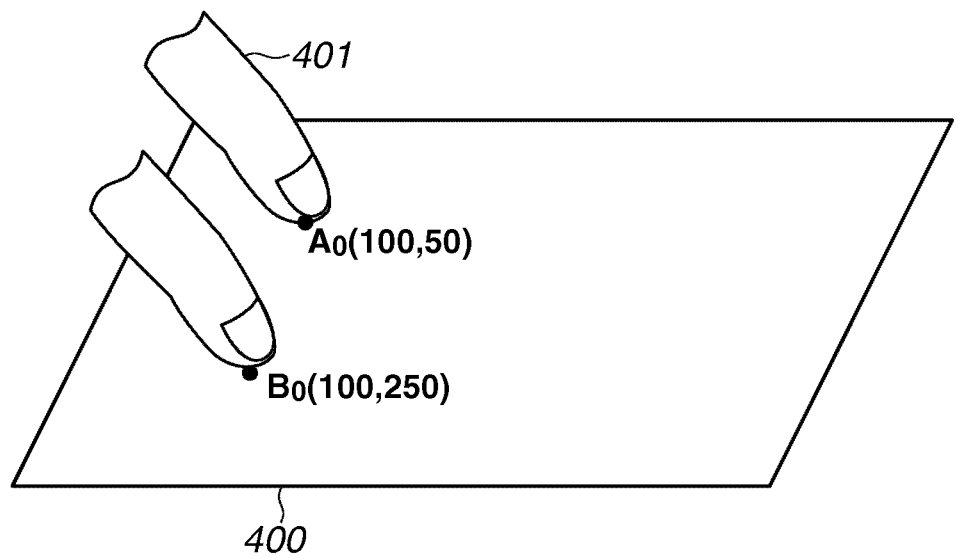
FIGS. 6A and 6B illustrates an example movement of two touch points in a multi-drag operation.
Figure 6B:
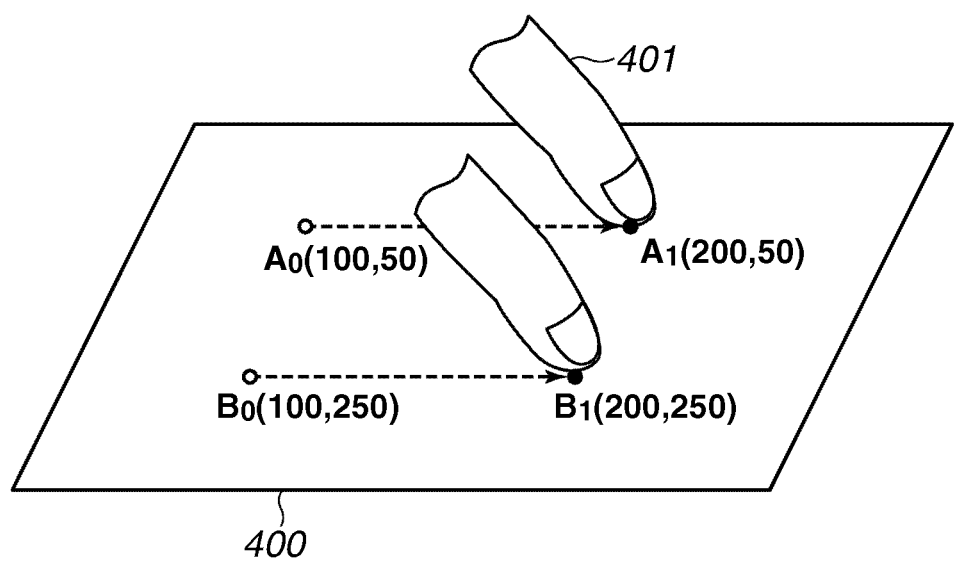

First, an example to which the modified example 1 of the first exemplary embodiment can be effectively applied is described in detail below. FIGS. 6A and 6B illustrate an example detection of touch points that constitute a multi-drag operation. FIG. 6A illustrates the positions of two fingers 401 at the time when the fingers 401 have first contacted the input area 400. FIG. 6B illustrates an example state of two fingers 401, which have moved from the state illustrated in FIG. 6A. The movement distance of each touch point is +100 dots in the X-axis direction, similar to the operational example 1 illustrated in FIGS. 4A and 4B. However, the distance between two touch points illustrated in FIGS. 6A and 6B is larger than that the two-point distance illustrated in FIGS. 4A and 4B described in the operational example 1. Further, similar to the operational example 1, the operational example 2, and the operational example 3, it is presumed that the threshold value "a" is 30 dots.

The two-point distance acquired at the time when the touch point $A_0$ (100, 50) and the touch point $B_0$ (100, 250) illustrated in FIG. 6A are detected is the distance (=200 dots) between the touch point $A_0$ and the touch point $B_0$. Therefore, 200 dots are stored as the initial distance and the reference distance. Next, the two-point distance acquired at the time when the touch point $A_1$ (200, 50) is detected as illustrated in FIG. 6B is the distance (=223.6 dots) between the touch point $B_0$ and the touch point $A_1$. At this moment, the absolute value of the difference between the two-point distance (=223.6 dots) and the reference distance (=200 dots) is equal to 23.6 dots (i.e., the value that is smaller than the threshold value "a"). As described above, there is the tendency that the change amount in the two-point distance does not exceed the threshold value "a" if the initial distance between two points is large, compared to a case where the initial distance is small, even if the movement distance is the same. It is believed that, in a case where the two-point distance is large, a change amount in the distance between two touch points moved by a user to perform an operation is smaller compared to the two-point distance. Accordingly, if the detected change in the two-point distance exceeds the threshold value "a" even though the initial distance is large, it can be regarded that a user has positively changed the two-point distance. More specifically, there is the higher possibility that the user has input a pinch operation.

Hence, in the modified example 1, if the two-point distance at the time when a user has started the touch is large, the information processing apparatus 100 changes the predetermined number of times to be referred to in determining the start of a pinch operation to a smaller number of times in such a way as to prevent the output of a result of the input pinch operation from being delayed.

The hardware configuration of the information processing apparatus 100 according to the modified example 1 of the first exemplary embodiment is similar to the hardware configuration of the first exemplary embodiment illustrated in FIG. 1A and therefore the description thereof is not repeated.

FIG. 1C is a block diagram illustrating another example of the functional configuration of the information processing apparatus 100 according to the present exemplary embodiment. The configuration illustrated in FIG. 1C is different from the configuration illustrated in FIG. 1B in that a changing unit 116 is additionally included. The changing unit 116 is configured to change the predetermined number of times, which is to be referred to in determining the start of an input of the pinch operation, to a smaller value according to the two-point distance information acquired by the acquisition unit 112. Further, the changing unit 116 is configured to send the changed predetermined number of times to the first determination unit 113. The changing unit 116 according to the modified example 1 of the first exemplary embodiment performs processing for changing the predetermined number of times to a smaller number of times especially in a case where the two-point distance acquired by the acquisition unit 112 is equal to or greater than a predetermined distance.

Figure 7:
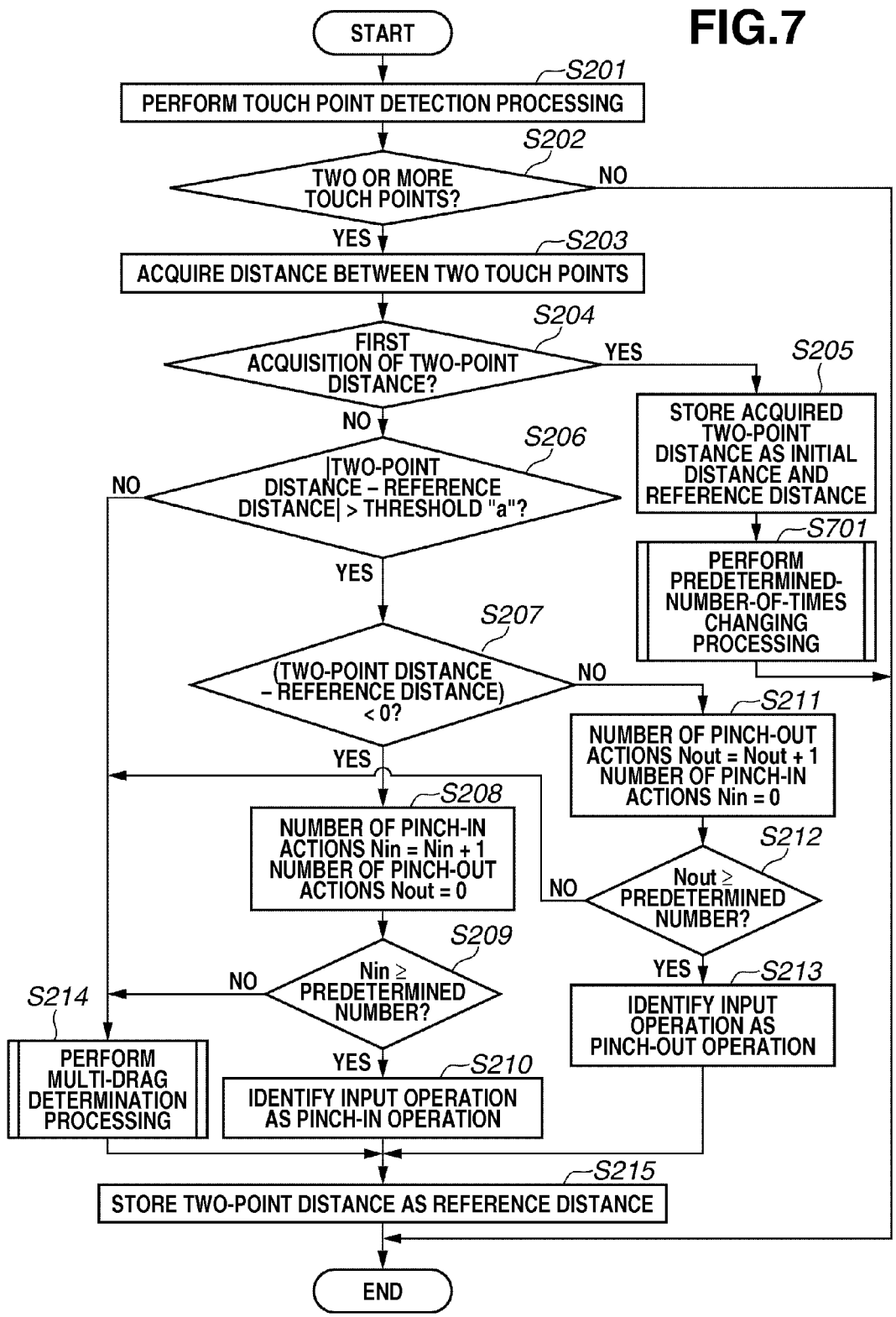
FIG. 7 is a flowchart illustrating an example of multi-touch operation recognizing processing that can be performed by the information processing apparatus according to an exemplary embodiment.

FIG. 7 is a flowchart illustrating an example of multi-touch operation recognizing processing that can be performed by the information processing apparatus 100 according to the modified example 1 of the first exemplary embodiment. Processing steps, whose contents are similar to those illustrated in FIG. 2, are denoted by the same reference numerals and the descriptions thereof are not repeated. Only the processing step not included in the flowchart of FIG. 2 is described in detail below. In the modified example 1 of the first exemplary embodiment, in step S205, the information processing apparatus 100 stores the two-point distance between touch points first acquired by the acquisition unit 112 as an initial distance and a reference distance. Then, the operation proceeds to step S701. In step S701, the changing unit 116 performs processing for changing the predetermined number of times to be satisfied with respect to continuous detections in determining the start of an input of a pinch (i.e., pinch-out or pinch-in) operation.

Figure 8A:
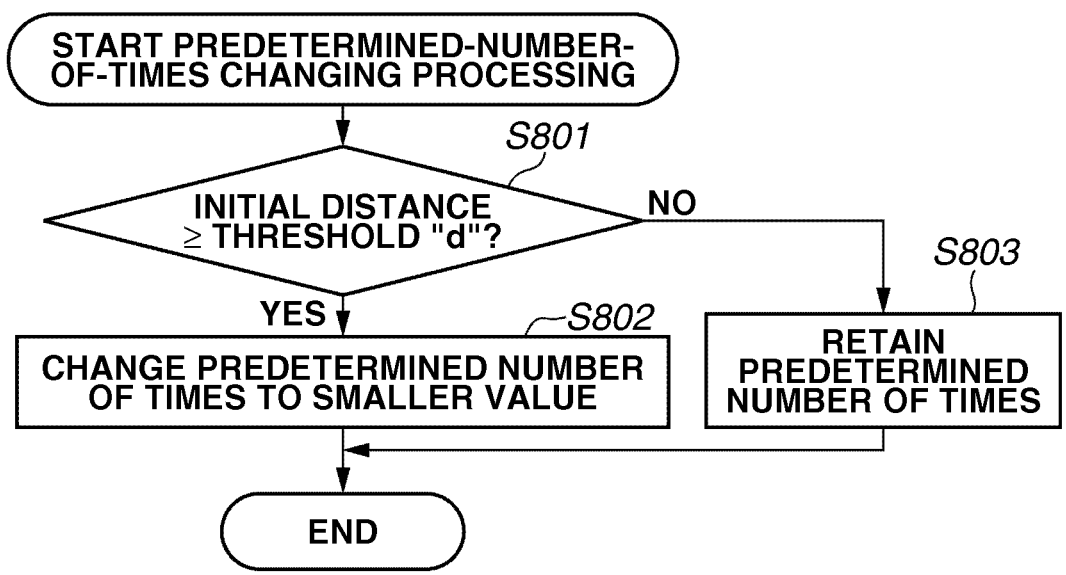
FIGS. 8A, 8B, and 8C are flowcharts each illustrating an example of predetermined-number-of-times changing processing that can be performed by the information processing apparatus according to an exemplary embodiment.

FIG. 8A is a flowchart illustrating an example flow of the predetermined-number-of-times changing processing to be performed in step S701 according to the modified example 1 of the first exemplary embodiment. In step S801, the changing unit 116 determines whether the stored initial distance is equal to or greater than a threshold value "d." In the present exemplary embodiment, the threshold value "d" is a threshold value that represents the magnitude of distance registered beforehand in the information processing apparatus 100, which can be set with reference to the size of the touch panel display device 108, the detection interval of the latest touch point information, and the threshold value "a." If it is determined that the initial distance is equal to or greater than the threshold value "d" (YES in step S801), the operation proceeds to step S802. On the other hand, if it is determined that the initial distance is less than the threshold value "d" (NO in step S801), the operation proceeds to step S803.

In step S802, the changing unit 116 changes the predetermined number of times to be referred to in determining an input of a pinch operation to a smaller number of times. In the present exemplary embodiment, it is presumed that the predetermined number of times is set to only one time. Then, the changing unit 116 stores the changed predetermined number of times in the RAM 103 and sends the changed predetermined number of times to the first determination unit 113. The changed predetermined number of times is retained until user's releasing the touch points to terminate the current touch operation is detected or until new touch points to perform the next touch operation is detected. As described above, in a case where the initial distance is equal to or greater than the threshold value "d", there is the tendency that a change amount in the two-point distance is a relatively smaller value and does not exceed the threshold value "a" when the user moves two touch points before the next touch point information is detected. Therefore, if the change amount in the two-point distance exceeds the threshold value "a" even though the two-point distance is large, there is the higher possibility that the user has input a pinch operation. Thus, the information processing apparatus 100 uses a smaller value as the predetermined number of times (i.e., a value smaller than the ordinary setting value) to identify an input of the pinch operation. On the other hand, in step S803, the changing unit 116 retains the predetermined number of times stored by the first determination unit 113 and terminates the processing of the flowchart illustrated in FIG. 8A.

As described above, in the modified example 1 of the first exemplary embodiment, if the two-point distance at the time when a user has started the touch is greater than the predetermined distance (i.e., the threshold value "d"), the information processing apparatus 100 changes the predetermined number of times to be referred to in determining the start of an input of the pinch-out or pinch-in operation to a smaller number of times. More specifically, if the change amount in the two-point distance is equal to or greater than the threshold value "a" even though the two-point distance is large at the time when the user has started the touch, there is the higher possibility that the user has input a pinch operation. Therefore, the information processing apparatus 100 immediately performs processing for enlarging or reducing the displayed image in such a way as to promptly output a result obtained by a user's operation.

Further, as a modified example 2 of the first exemplary embodiment, in a case where the detection interval of the latest touch point information is short, the information processing apparatus 100 changes the predetermined number of times to be satisfied with respect to continuous detections in determining the start of an input of a pinch-out or pinch-in operation to a smaller number of times, as described below.

Figure 9A:
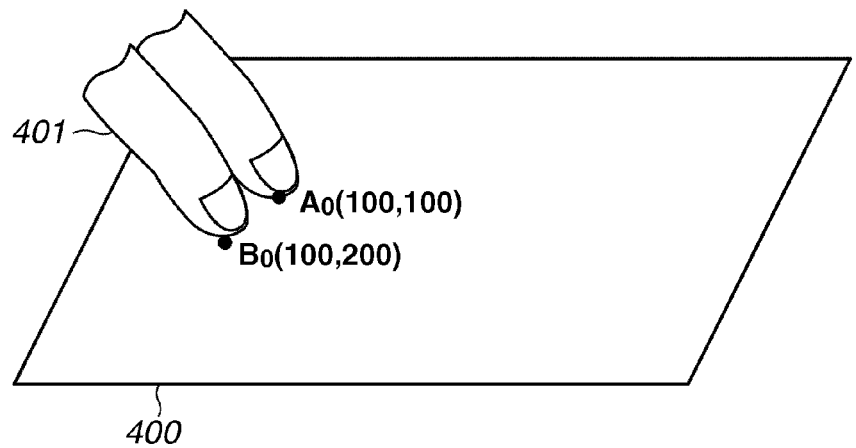
FIGS. 9A, 9B, and 9C illustrate an example movement of two touch points in a multi-drag operation.
Figure 9B:
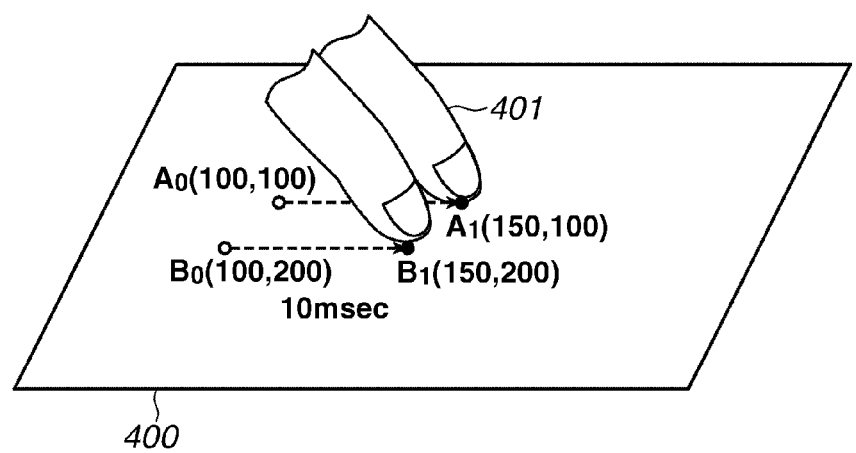
Figure 9C:
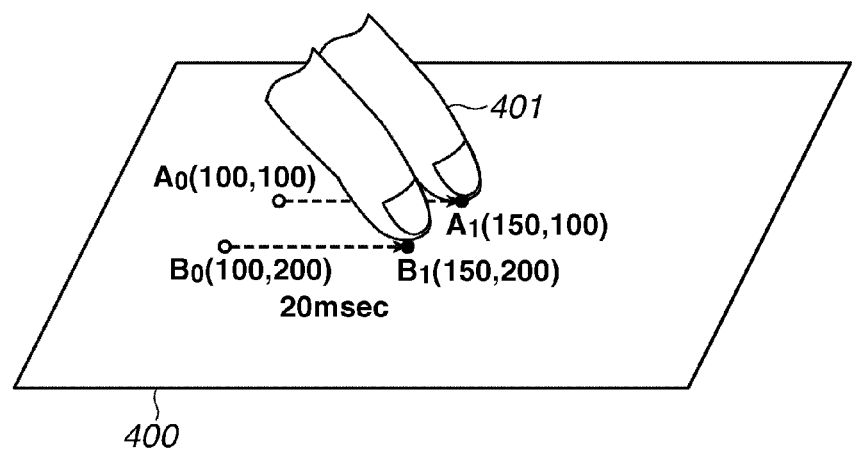

First, an example to which the modified example 2 of the first exemplary embodiment can be effectively applied is described in detail below. FIGS. 9A, 9B, and 9C illustrate an example detection of touch points that constitute a multi-drag operation. FIG. 9A illustrates the positions of two fingers 401 at the time when the fingers 401 have first contacted the input area 400. FIG. 9B illustrates an example state of two fingers 401 that have moved from the state illustrated in FIG. 9A. However, in the example illustrated in FIGS. 9A and 9B, it is presumed that the input interface 105 refers to touch point information detected by the touch panel (namely, detects the latest information relating to the touch points) at the intervals of 10 milliseconds, which is shorter than 20 milliseconds described in the operational example 1. The latest touch point position detection interval is reduced by one half, compared to the operational example 1 illustrated in FIG. 4. In FIG. 9B, the movement distance of each touch point before detection of the latest position of the same ID touch point is 50 dots (i.e., ½ of 100 dots). Further, similar to the operational example 1, the operational example 2, and the operational example 3, it is presumed that the threshold value "a" is set to 30 dots in the modified example 2.

At the detection timing of two points of the touch point $A_0$ (100, 100) and the touch point $B_0$ (100, 200) illustrated in FIG. 9A, the information processing apparatus 100 stores the distance (=100 dots) between the touch point $A_0$ and the touch point $B_0$ as the initial distance and the reference distance, similar to the operational example 1 illustrated in FIG. 4A. Further, referring to touch point information obtained by the touch panel at the interval of 10 milliseconds, the information processing apparatus 100 acquires the distance (=111.8 dots) between the touch point $B_0$ and the touch point $A_1$, as the two-point distance, at the detection timing of the touch point $A_1$ (150, 100) illustrated in FIG. 9B. Then, the information processing apparatus 100 obtains the difference between the two-point distance (=111.8 dots) and the reference distance (=100 dots). The absolute value of the obtained difference is 11.8 dots, which is smaller the threshold value "a." As described above, in a case where the latest position of the touch points is detected at short intervals, the touch point movable distance becomes shorter. Therefore, the change amount in the two-point distance tends to be smaller than the threshold value "a." Accordingly, if the detected change in the two-point distance exceeds the threshold value "a" even though the latest position of the touch points is detected at short intervals, it can be regarded that a user has positively changed the two-point distance. More specifically, there is the higher possibility that the user has input a pinch operation.

Hence, in the modified example 2, the information processing apparatus 100 changes the predetermined number of times to be referred to in determining an input of a pinch operation to a smaller number of times in such a way as to prevent the output of a result of the input pinch operation from being delayed, in a case where the latest position of the touch points is detected at short intervals.

A hardware configuration of the information processing apparatus 100 according to the modified example 2 of the first exemplary embodiment is similar to the configuration described in the first exemplary embodiment (see FIG. 1A) and therefore the description thereof is not repeated. Further, a functional configuration of the information processing apparatus 100 according to the modified example 2 of the first exemplary embodiment is similar to the configuration of the modified example 1 of the first exemplary embodiment illustrated in FIG. 1C. However, the changing unit 116 of the modified example 2 of the first exemplary embodiment performs processing for changing the predetermined number of times to a smaller number of times in a case where the detection interval is shorter than a predetermined time when the detection unit 111 detects the latest position of the touch points of the same ID.

Figure 8B:
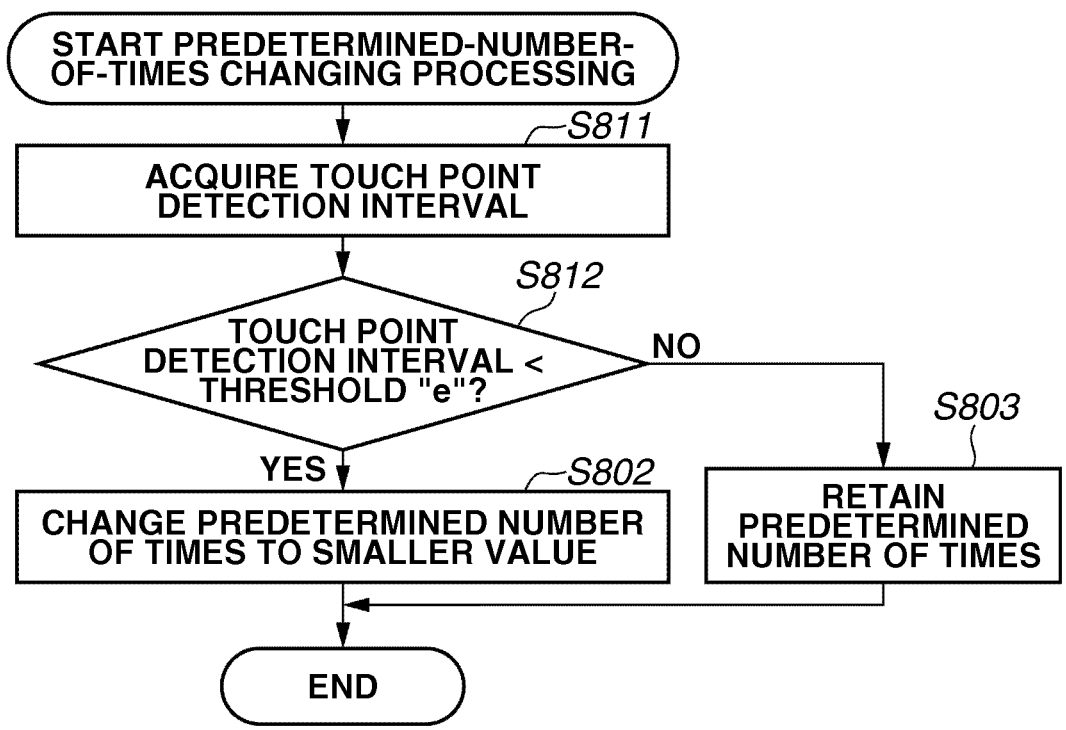

FIG. 10 is a flowchart illustrating an example of the multi-touch operation recognizing processing that can be performed by the information processing apparatus 100 according to the modified example 2 of the first exemplary embodiment. Processing steps, whose contents are similar to those illustrated in FIG. 2 and FIG. 7, are denoted by the same reference numerals and the descriptions thereof are not repeated. Only the processing step not included in the flowchart illustrated FIG. 7 is described in detail below. In the modified example 2 of the first exemplary embodiment, if the acquisition unit 112 determines the two-point distance acquisition processing is not the first time (NO in step S204), the operation proceeds to the predetermined-number-of-times changing processing illustrated in step S1001. In step S1001, the changing unit 116 performs the predetermined-number-of-times changing processing according to a flowchart illustrated in FIG. 8B.

First, in step S811, the changing unit 116 acquires information indicating the interval at which the detection unit 111 detects the latest position of each touch point (i.e., touch point detection interval). In the present exemplary embodiment, it is presumed that the detection unit 111 controls the interval at which the input interface 105 refers to touch point information of the touch panel. Accordingly, the changing unit 116 acquires the information indicating the touch point detection interval from the detection unit 111. However, it is also useful that the changing unit 116 acquires setting information relating to the touch point detection interval from an application.

Next, in step S812, the changing unit 116 determines whether the touch point detection interval is less than a threshold value "e." The threshold value "e" is a threshold value that represents the period of time registered beforehand in the information processing apparatus 100, which can be set with reference to the size of the touch panel display device 108 and the threshold value "a." If it is determined that the touch point detection interval is less than the threshold value "e" (YES in step S812), the operation proceeds to step S802. On the other hand, if it is determined that the touch point detection interval is equal to or greater than the threshold value "e" (NO in step S812), the operation proceeds to step S803.

In step S802, similar to the modified example 1 of the first exemplary embodiment, the changing unit 116 changes the predetermined number of times to be referred to in determining an input of a pinch operation to a smaller number of times. Then, the changing unit 116 stores the changed predetermined number of times in the RAM 103, and sends the changed predetermined number of times to the first determination unit 113. In a case where the touch point detection interval is less than the threshold value "e", a change amount in the two-point distance that may be caused when a user moves two touch points during a single touch point detection interval tends to be smaller the threshold value "a." Accordingly, if the change amount in the two-point distance exceeds the threshold value "a" even though the touch point detection interval is short, there is the higher possibility that the user has input a pinch operation. Thus, the information processing apparatus 100 uses a smaller value as the predetermined number of times (i.e., a value smaller than the ordinary setting value) to identify an input of the pinch operation. On the other hand, in step S803, the changing unit 116 retains the predetermined number of times stored by the first determination unit 113 and terminates the processing of the flowchart illustrated in FIG. 8B.

As described above, in the modified example 2 of the first exemplary embodiment, if the detection interval of the latest touch point position is shorter than the predetermined time (i.e., the threshold value "e"), the information processing apparatus 100 changes the predetermined number of times to be referred to in determining the start of an input of the pinch-out or pinch-in operation to a smaller number of times. More specifically, if the detected change amount in the two-point distance is equal to or greater than the threshold value "a" even though the information relating to a position touched by a user is updated at short intervals, there is the higher possibility that the user has input a pinch operation. Therefore, the information processing apparatus 100 immediately performs processing for enlarging or reducing the displayed image in such a way as to promptly output a result obtained by a user's operation.

Further, in the modified example 2, the information processing apparatus 100 performs the predetermined-number-of-times changing processing immediately after the two-point distance has been acquired at least two times. However, the modified example 2 is not limited to the above-described example. For example, the information processing apparatus 100 can perform the predetermined-number-of-times changing processing illustrated in FIG. 8B at the time when the information processing apparatus 100 is activated or at the time when the touch point detection interval is changed by an application. In this case, the changing unit 116 stores the changed predetermined number of times in the RAM 103, and sends the changed predetermined number of times to the first determination unit 113. Further, in the multi-touch operation recognizing processing to be performed according to the flowchart illustrated in FIG. 2, the first determination unit 113 refers to the changed predetermined number of times in the processing for comparing the number of pinch-in actions Nin or the number of pinch-out actions Nout with the predetermined number of times. Further, in the modified example 2, if the touch point detection interval is shorter than the predetermined time, the information processing apparatus 100 changes the predetermined number of times to be referred to in determining a pinch operation to a smaller number of times. To the contrary, the information processing apparatus 100 can change the predetermined number of times to be referred to in determining a pinch operation to a larger value if the touch point detection interval is equal to or longer than the predetermined time.

Next, as a modified example 3 of the first exemplary embodiment, in a case where the touch point movement speed is low, the information processing apparatus 100 changes the predetermined number of times to be satisfied with respect to continuous detections in determining the start of an input of a pinch-out or pinch-in operation to a smaller number of times, as described below.

First, an example to which the modified example 3 of the first exemplary embodiment can be effectively applied is described in detail below. FIG. 9A illustrates the positions of two fingers 401 at the time when these fingers 401 have first contacted the input area 400, as described in the modified example 2. Further, FIG. 9C illustrates an example state of two fingers 401 that have moved from the state illustrated in FIG. 9A. However, in the example illustrated in FIGS. 9A and 9C, the touch point movement is slow. Therefore, in a case where the latest position of the touch points is detected at intervals of 20 milliseconds (i.e., at the intervals described in the operational example 1), the movement distance of each touch point movable before a touch point of the same ID is detected is 50 dots (i.e., a relatively short distance). Further, similar to the operational example 1, the operational example 2, and the operational example 3, it is presumed that the threshold value "a" is 30 dots.

At the detection timing of two points of the touch point $A_0$ (100,100) and the touch point $B_0$ (100,200) illustrated in FIG. 9A, the information processing apparatus 100 stores the distance (=100 dots) between the touch point $A_0$ and the touch point $B_0$ as the initial distance and the reference distance, similar to the operational example 1 illustrated in FIG. 4A. Further, the information processing apparatus 100 acquires the distance (=111.8 dots) between the touch point $B_0$ and the touch point $A_1$, as the two-point distance, at the detection timing of the touch point $A_1$ (150, 100) illustrated in FIG. 9B. Then, the information processing apparatus 100 obtains the difference between the two-point distance (=111.8 dots) and the reference distance (=100 dots). The absolute value of the obtained distance is 11.8 dots, which is smaller than the threshold value "a." As described above, in a case where the touch point movement speed is low, the touch point movable distance is short and the change amount in the two-point distance tends to be smaller than the threshold value "a" before the next touch point is detected becomes smaller. Accordingly, if the detected change in the two-point distance exceeds the threshold value "a" even though the touch point movement speed is small, it can be regarded that a user has positively changed the two-point distance. More specifically, there is the higher possibility that the user has input a pinch operation.

Hence, in the modified example 3, the information processing apparatus 100 changes the predetermined number of times to be referred to in determining an input of a pinch operation to a smaller number of times in such away as to prevent the output of a result of the input pinch operation from being delayed, in a case where the touch point movement speed is small.

A hardware configuration of the information processing apparatus 100 according to the modified example 3 of the first exemplary embodiment is similar to the hardware configuration illustrated in FIG. 1A according to the first exemplary embodiment and therefore the description thereof is not repeated. Further, a functional configuration of the information processing apparatus 100 according to the modified example 3 of the first exemplary embodiment is similar to the functional configuration illustrated in FIG. 1C described in the modified example 1 of the first exemplary embodiment. However, the changing unit 116 according to the modified example 3 of the first exemplary embodiment is configured to perform processing for changing the predetermined number of times to a smaller number of times if the movement speed of the touch point detected by the detection unit 111 is smaller than a predetermined speed.

Figure 8C:
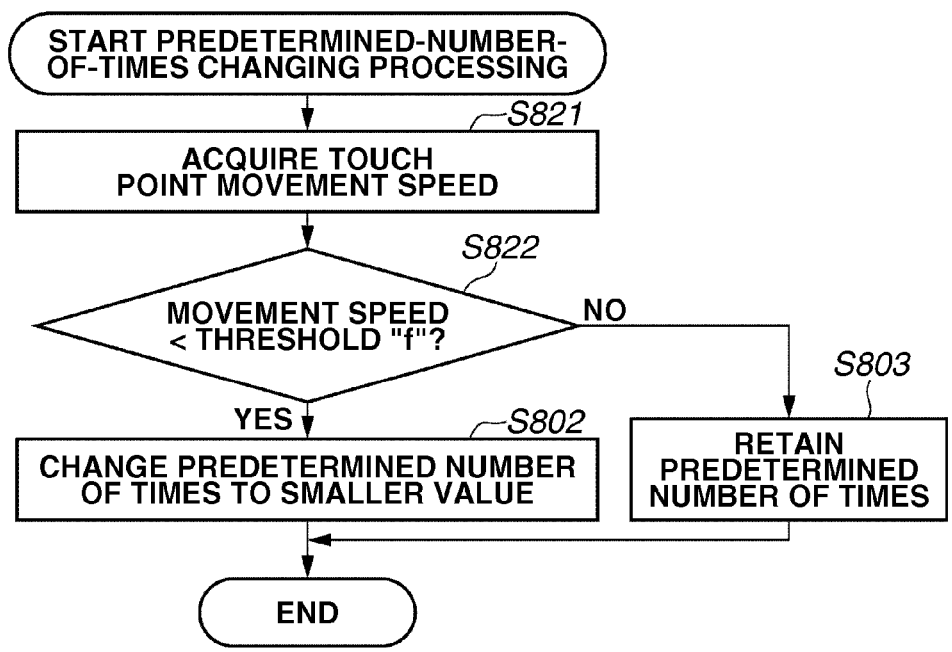

In the modified example 3 of the first exemplary embodiment, the information processing apparatus 100 performs multi-touch operation recognizing processing according to the flowchart illustrated in FIG. 10. However, in step S1001, the changing unit 116 performs the predetermined-number-of-times changing processing according to a flowchart illustrated in FIG. 8C.

First, in step S821, the changing unit 116 acquires a touch point movement speed. In this case, the changing unit 116 obtains the movement speed based on a touch point movement distance, which can be obtained based on information indicating the previously detected touch point position and information indicating the presently detected touch point position, as well as the touch point detection interval, which are stored by the detection unit 111. According to the example illustrated in FIG. 9C, the movement speed obtained by the changing unit 116 is 2.5 dots per millisecond because the movement distance between the touch point $A_0$ and the touch point $A_1$ is 50 dots and the touch point detection interval is 20 milliseconds. Similarly, the changing unit 116 can obtain a movement speed based on the movement distance between the touch point $B_0$ and the touch point $B_1$ and the touch point detection interval (=20 milliseconds).

In step S822, the changing unit 116 determines whether the movement speed acquired in step S821 is less than a threshold value "f." The threshold value "f" is a threshold value that represents the magnitude of speed registered beforehand in the information processing apparatus 100, which can be set with reference to the size of the touch panel display device 108, the touch point detection interval, and the threshold value "a." If it is determined that the touch point movement speed is lower than the threshold value "f" (YES in step S822), the operation proceeds to step S802. On the other hand, if it is determined that the touch point movement speed is equal to or higher than the threshold value "f", the operation proceeds to step S803.

In step S802, similar to the modified example 1 and the modified example 2 of the first exemplary embodiment, the changing unit 116 changes the predetermined number of times to be referred to in determining an input of a pinch operation to a smaller number of times. Then, the changing unit 116 stores the changed predetermined number of times in the RAM 103 and sends the changed predetermined number of times to the first determination unit 113. On the other hand, in step S803, the changing unit 116 retains the predetermined number of times stored by the first determination unit 113 and terminates the processing of the flowchart illustrated in FIG. 8C.

As described above, in the modified example 3 of the first exemplary embodiment, if the touch point movement speed is lower than the predetermined speed (i.e., the threshold value "f"), the information processing apparatus 100 changes the predetermined number of times to be referred to in determining the start of an input of the pinch-out or pinch-in operation to a smaller number of times. More specifically, if the detected change amount in the two-point distance is equal to or greater than the threshold value "a" even though a touch point movement caused by a user is slow, there is the higher possibility that the user has input a pinch operation. Therefore, the information processing apparatus 100 immediately performs processing for enlarging or reducing the displayed image in such a way as to promptly output a result obtained by a user's operation.

Further, in the present exemplary embodiment, the information processing apparatus 100 obtains the touch point movement speed in the transition from the previous detection position to the present detection position in response to each touch point detection. However, it is useful to obtain a mean speed every time a plurality of touch point detections has been completed because the accuracy in detecting the touch point position on the touch panel can be prevented from being deteriorated. Further, in the modified example 3, the information processing apparatus 100 changes the predetermined number of times to be referred to in determining an input of a pinch operation to a smaller number of times if the touch point movement speed is lower than the predetermined speed. To the contrary, it is useful to change the predetermined number of times to a larger value if the touch point movement speed is equal to or higher than the predetermined speed.

According to the method employed in the modified example of the above-described first exemplary embodiment, the information processing apparatus 100 has changed the predetermined number of times to a smaller number of times only one time (i.e., a fixed value) in step S802. However, it is useful to change the predetermined number of times in each processing, for example, in such a way as to decrement the value in step S802 and increment the value in step S803. Further, it is useful to provide a plurality of threshold values considering the magnitude of the two-point distance, the touch point detection interval, and the touch point movement speed in such a way as to realize a stepwise change of the predetermined number of times.

As described above, the information processing apparatus 100 according to the present exemplary embodiment changes the predetermined number of times (i.e., a condition to be used in identifying an input of a pinch operation) to a smaller number of times considering a situation, in such a way as to promptly respond to a user's operation. Further, it is useful to change the threshold value "a" to be referred to in determining whether the distance between two touch points has been enlarged or reduced considering a situation, in such away as to promptly respond to a user's operation, as described in the above-described modified example.

In the first exemplary embodiment, each time the detection unit 111 detects a touch point, the information processing apparatus 100 determines whether a user has started an input of a pinch operation. In a case where no pinch operation is started, the information processing apparatus 100 determines whether the user has input another multi-touch operation. However, as another exemplary embodiment, the information processing apparatus 100 can perform the pinch operation determination processing and the multi-touch operation determination processing independently each time the detection unit 111 detects a touch point. In this case, for example, the information processing apparatus 100 performs pinch determination processing according to the flowchart illustrated in FIG. 2 while skipping the processing in step S214. Further, the information processing apparatus 100 performs the multi-drag determination processing according to the flowchart illustrated in FIG. 3 in series or in parallel with the pinch determination processing. However, it is desired to perform the processing only when a plurality of touch points is detected. To this end, it is useful to provide additional steps similar to steps S201 and S202 illustrated in FIG. 2 in such a way as to be immediately executed after the information processing apparatus 100 starts the processing according to the flowchart illustrated in FIG. 3. In a case where the information processing apparatus 100 independently performs a plurality of processing for determining whether a plurality of multi-touch operations has been input, the information processing apparatus 100 recognizes an input of a pinch operation only when the distance between two touch points that constitute a multi-touch operation has been continuously enlarged or reduced a predetermined number of times. In a case where the acquisition of positional information of a plurality of touch points that constitute a multi-touch operation is performed one by one, the above-described processing is useful to prevent an input of a pinch operation from been unintentionally determined and prevent the display magnification of a displayed image from being unwontedly changed due to an erroneous operation. As described above, according to the method for independently performing a plurality of processing to determine whether a plurality of multi-touch operations has been input, the information processing apparatus 100 can perform a necessary adjustment (e.g., selecting processing to be executed to limit the number of multi-touch operations recognizable for each application) and further can adjust the processing load.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-050682 filed Mar. 7, 2012, which is hereby incorporated by reference herein in its entirety.

What is claimed is:

1. An information processing apparatus comprising:
a display configured to display an image;
a memory storing instructions; and
at least one processor that, upon execution of the instructions, is configured to:
acquire, in order, a first position of a first moving object touching the display, a first position of a second moving object touching the display, a second position of the first moving object touching the display and a second position of the second moving object touching the display;
acquire a distance between the acquired positions, in order, as (a) a first distance between the first position of the first moving object and the first position of the second moving object, (b) a second distance between the second position of the first moving object and the first position of the second moving object, and (c) a third distance between the second position of the first moving object and the second position of the second moving object;
determine whether the second distance is longer than the first distance, and whether the third distance is longer than the second distance; and
enlarge the displayed image in response to determining, in succession, that the second distance is longer than the first distance and the third distance is longer than the second distance,
wherein the displayed image is not enlarged until it is determined that the third distance is longer than the second distance after it has been determined that the second distance is longer than the first distance.

2. The information processing apparatus according to claim 1, wherein the at least one processor is configured to acquire each of the first position of the first moving object, the first position of the second moving object, the second position of the first moving object and the second position of the second moving object at intervals, and
to further determine, in a case where it has been determined that the second distance is longer than the first distance but the third distance is shorter than the second distance, whether the third distance is substantially the same as the first distance.

3. The information processing apparatus according to claim 2,
wherein the at least one processor is further configured to specify and display an image different from the image displayed on the display, in a case that the third distance is substantially the same as the first distance.

4. The information processing apparatus according to claim 2, wherein the at least one processor is further configured to
determine whether the second distance is shorter than the first distance and whether the third distance is shorter than the second distance, and
reduce the displayed image in response to determining that the second distance is shorter than the first distance and the third distance is shorter than the second distance.

5. A method of controlling an information processing apparatus, the method comprising:
acquiring, in order, a first position of a first moving object touching the display, a first position of a second moving object touching the display, a second position of the first moving object touching the display and a second position of the second moving object touching the display;

acquiring a distance between the acquired positions, in order, as (a) a first distance between the first position of the first moving object and the first position of the second moving object, (b) a second distance between the second position of the first moving object and the first position of the second moving object, and (c) a third distance between the second position of the first moving object and the second position of the second moving object;

determining whether the second distance is longer than the first distance, and whether the third distance is longer than the second distance; and enlarging an image being displayed on a display unit in response to determining, in succession, that the second distance is longer than the first distance and the third distance is longer than the second distance, wherein the displayed image is not enlarged until it is determined that the third distance is longer than the second distance after it has been determined that the second distance is longer than the first distance.

6. A non-transitory computer readable storage medium storing instructions that, when executed by at least one processor, execute a method of controlling an information processing apparatus, the method comprising:

acquiring, in order, a first position of a first moving object touching the display, a first position of a second moving object touching the display, a second position of the first moving object touching the display and a second position of the second moving object touching the display;

acquiring a distance between the acquired positions, in order, as (a) a first distance between the first position of the first moving object and the first position of the second moving object, (b) a second distance between the second position of the first moving object and the first position of the second moving object, and (c) a third distance between the second position of the first moving object and the second position of the second moving object;

determining whether the second distance is longer than the first distance, and whether the third distance is longer than the second distance; and enlarging an image being displayed on a display unit in response to determining, in succession, that the second distance is longer than the first distance and the third distance is longer than the second distance, wherein the displayed image is not enlarged until it is determined that the third distance is longer than the second distance after it has been determined that the second distance is longer than the first distance.

7. An information processing apparatus comprising:
a display configured to display an image;
a memory storing instructions; and
at least one processor that, upon execution of the instructions, is configured to:
acquire, in order, a first position of a first moving object touching the display, a first position of a second moving object touching the display, a second position of the first moving object touching the display and a second position of the second moving object touching the display;
acquire a distance between the acquired positions, in order, as (a) a first distance between the first position of the first moving object and the first position of the second moving object, (b) a second distance between the second position of the first moving object and the first position of the second moving object, and (c) a third distance between the second position of the first moving object and the second position of the second moving object;

determine whether the second distance is shorter than the first distance and whether the third distance is shorter than the second distance, and reduce the displayed image in response to determining, in succession, that the second distance is shorter than the first distance and the third distance is shorter than the second distance, wherein the displayed image is not reduced until it is determined that the third distance is shorter than the second distance after it has been determined that the second distance is shorter than the first distance.

8. The information processing apparatus according to claim 7, wherein the at least one processor is configured to acquire each of the first position of the first moving object, the first position of the second moving object, the second position of the first moving object and the second position of the second moving object at intervals, and further determine, in a case where it has been determined that the second distance is longer than the first distance but the third distance is shorter than the second distance, whether the third distance is substantially the same as the first distance.

9. The information processing apparatus according to claim 8, wherein the at least one processor is further configured to specify and display an image different from the image displayed on the display, in a case that the third distance is substantially the same as the first distance.

10. A method of controlling an information processing apparatus, the method comprising:

acquiring, in order, a first position of a first moving object touching the display, a first position of a second moving object touching the display, a second position of the first moving object touching the display and a second position of the second moving object touching the display;

acquiring a distance between the acquired positions, in order, as (a) a first distance between the first position of the first moving object and the first position of the second moving object, (b) a second distance between the second position of the first moving object and the first position of the second moving object, and (c) a third distance between the second position of the first moving object and the second position of the second moving object;

determining whether the second distance is shorter than the first distance and whether the third distance is shorter than the second distance, and reducing the displayed image in response to determining, in succession, that the second distance is shorter than the first distance and the third distance is shorter than the second distance, wherein the displayed image is not reduced until it is determined that the third distance is shorter than the second distance after it has been determined that the second distance is shorter than the first distance.

11. A non-transitory computer readable storage medium storing instructions that, when executed by at least one processor, execute a method of controlling an information processing apparatus, the method comprising:

acquiring, in order, a first position of a first moving object touching the display, a first position of a second moving object touching the display, a second position of the first moving object touching the display and a second position of the second moving object touching the display;

acquiring a distance between the acquired positions, in order, as (a) a first distance between the first position of the first moving object and the first position of the second moving object, (b) a second distance between the second position of the first moving object and the first position of the second moving object, and (c) a third distance between the second position of the first moving object and the second position of the second moving object;

determining whether the second distance is shorter than the first distance and whether the third distance is shorter than the second distance, and reducing the displayed image in response to determining, in succession, that the second distance is shorter than the first distance and the third distance is shorter than the second distance, wherein the displayed image is not reduced until it is determined that the third distance is shorter than the second distance after it has been determined that the second distance is shorter than the first distance.

\* \* \* \* \*